US012578352B2

(12) United States Patent
    Chang et al.

(10) Patent No.: US 12,578,352 B2
(45) Date of Patent: Mar. 17, 2026

(54) METHODS AND APPARATUS PROVIDING CALIBRATION OF FOREGROUND ILLUMINATION FOR SAMPLE CONTAINER CHARACTERIZATION

(71) Applicant: Siemens Healthcare Diagnostics Inc., Tarrytown, NY (US)

(72) Inventors: Yao-Jen Chang, Princeton, NJ (US); Patrick Wissmann, Munich (DE); Ludwig Listl, Munich (DE); Benjamin S. Pollack, Jersey City, NJ (US); Ramkrishna Jangale, Pune (IN); Rayal Raj Prasad Nalam Venkat, Princeton, NJ (US); Venkatesh NarasimhaMurthy, Hillsborough, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 973 days.

(21) Appl. No.: 17/755,469

(22) PCT Filed: Oct. 22, 2020

(86) PCT No.: PCT/US2020/056924
    § 371 (c)(1),
    (2) Date: Apr. 29, 2022

(87) PCT Pub. No.: WO2021/086723
    PCT Pub. Date: May 6, 2021

(65) Prior Publication Data
    US 2022/0390478 A1      Dec. 8, 2022

Related U.S. Application Data

(60) Provisional application No. 62/929,068, filed on Oct. 31, 2019.

(51) Int. Cl.
    *G01N 35/00*          (2006.01)

(52) U.S. Cl.
    CPC . *G01N 35/00693* (2013.01); *G01N 35/00613* (2013.01); *G01N 35/00732* (2013.01)

(58) Field of Classification Search
    CPC ....... G01N 35/00693; G01N 35/00613; G01N 35/00732; G01N 21/274; G01N 21/278; G01J 3/10
    See application file for complete search history.

(56) References Cited

U.S. PATENT DOCUMENTS

| | | | |
|---|---|---|---|
| 7,628,507 | B2 | 12/2009 | Allen et al. |
| 10,451,541 | B2 | 10/2019 | Collins et al. |
| | | (Continued) | |

FOREIGN PATENT DOCUMENTS

| | | |
|---|---|---|
| CN | 101080617 A | 11/2007 |
| CN | 103608661 A | 2/2014 |
| | (Continued) | |

OTHER PUBLICATIONS

Extended EP Search Report dated Nov. 16, 2022 of corresponding European Application No. 20883482.0, 4 Pages.
(Continued)

*Primary Examiner* — John McGuirk

(57) ABSTRACT

A method of calibrating an imaging device adapted to characterize a feature of a sample container, such as a cap color or cap type. The method includes providing a calibration tube including an imaging surface at an imaging location of a first imaging apparatus; illuminating the imaging surface with light emitted from multiple front light sources; adjusting a drive current to each of the multiple front light sources to establish a substantially uniform intensity of the imaging surface; recording drive current values for the multiple front light sources; replacing the calibration tube
(Continued)

600

Providing A Calibration Tube Including An Imaging Surface At An Imaging Location Of A First Imaging Apparatus — 602

Illuminating The Imaging Surface With Light Emitted From Multiple Front Light Sources — 604

Adjusting Drive Current To The Multiple Front Light Sources To Establish A Substantially Uniform Light Intensity Of The Imaging Surface — 606

Recording Drive Current Values For The Multiple Front Light Sources — 608

Replacing The Calibration Tube With A Calibration Tool Having A Calibration Surface Of A Known Reflectance — 610

Measuring Target Intensity Values Of The Calibration Tool At The Respective Drive Current Values — 612

Repeat For Other Wavelength(s) — 614

Repeat For Other Viewpoint(s) — 616 with a calibration tool having a calibration surface of a known reflectance; and measuring target intensity values of the calibration tool at the respective drive current values. Calibration tools, imaging apparatus, quality check modules, and health check methods are provided, as are other aspects.

19 Claims, 11 Drawing Sheets

(56)                     References Cited

U.S. PATENT DOCUMENTS

| | | | |
|---|---|---|---|
| 10,746,753 | B2 | 8/2020 | Kluckner et al. |
| 11,763,461 | B2 | 9/2023 | Ma et al. |
| 2010/0201809 | A1 | 8/2010 | Oyama et al. |
| 2014/0028857 | A1 | 1/2014 | Jasperse |
| 2014/0203173 | A1* | 7/2014 | Krufka ...................... G01J 1/42 250/214 R |
| 2016/0334403 | A1 | 11/2016 | Gibbons |
| 2017/0124704 | A1 | 5/2017 | Wu et al. |
| 2017/0236281 | A1 | 8/2017 | Dacosta |
| 2018/0209912 | A1 | 7/2018 | Yang |
| 2018/0364268 | A1 | 12/2018 | Kluckner et al. |
| 2018/0365530 | A1 | 12/2018 | Kluckner et al. |
| 2018/0372648 | A1 | 12/2018 | Wissmann et al. |
| 2019/0041318 | A1 | 2/2019 | Wissmann et al. |
| 2019/0271714 | A1 | 9/2019 | Kluckner et al. |
| 2021/0164965 | A1 | 6/2021 | Ma et al. |

FOREIGN PATENT DOCUMENTS

| | | | |
|---|---|---|---|
| CN | 102890423 | B | 7/2015 |
| CN | 105324671 | A | 2/2016 |
| CN | 105352969 | A | 2/2016 |
| CN | 107407632 | A | 11/2017 |
| CN | 108738338 | A | 11/2018 |
| CN | 108770364 | A | 11/2018 |
| JP | 2004-093972 | A | 3/2004 |
| JP | 2008-145316 | A | 6/2008 |
| JP | 2012-042229 | A | 3/2012 |
| JP | 2012-150083 | A | 8/2012 |
| JP | 2013079833 | A | 5/2013 |
| JP | 2014517271 | A | 7/2014 |
| JP | 2016212097 | A | 12/2016 |
| JP | 2019-505802 | A | 2/2019 |
| JP | 2019510963 | A | 4/2019 |
| KR | 20130022415 | A | 3/2013 |
| WO | 2012/151358 | A2 | 11/2012 |
| WO | 2013/134491 | A1 | 9/2013 |
| WO | 2018022280 | A1 | 2/2018 |
| WO | 2018/089935 | A1 | 5/2018 |
| WO | 2019/018313 | A1 | 1/2019 |
| WO | 2019023376 | A1 | 1/2019 |

OTHER PUBLICATIONS

PCT International Search Report and Written Opinion dated Feb. 10, 2021 (12 Pages).

Lee, D.-H. et al. (2017) 'A camera-based color calibration of tiled display systems under various illumination environments', Journal of Information Display, 18(2), pp. 73-85. doi: 10.1080/15980316. 2017.1291454.

* cited by examiner 124
125
131
129
41739217
127

124
125
131
129
0021200001
127

124
125'    125''
127
125

131

124

129

131

124

129

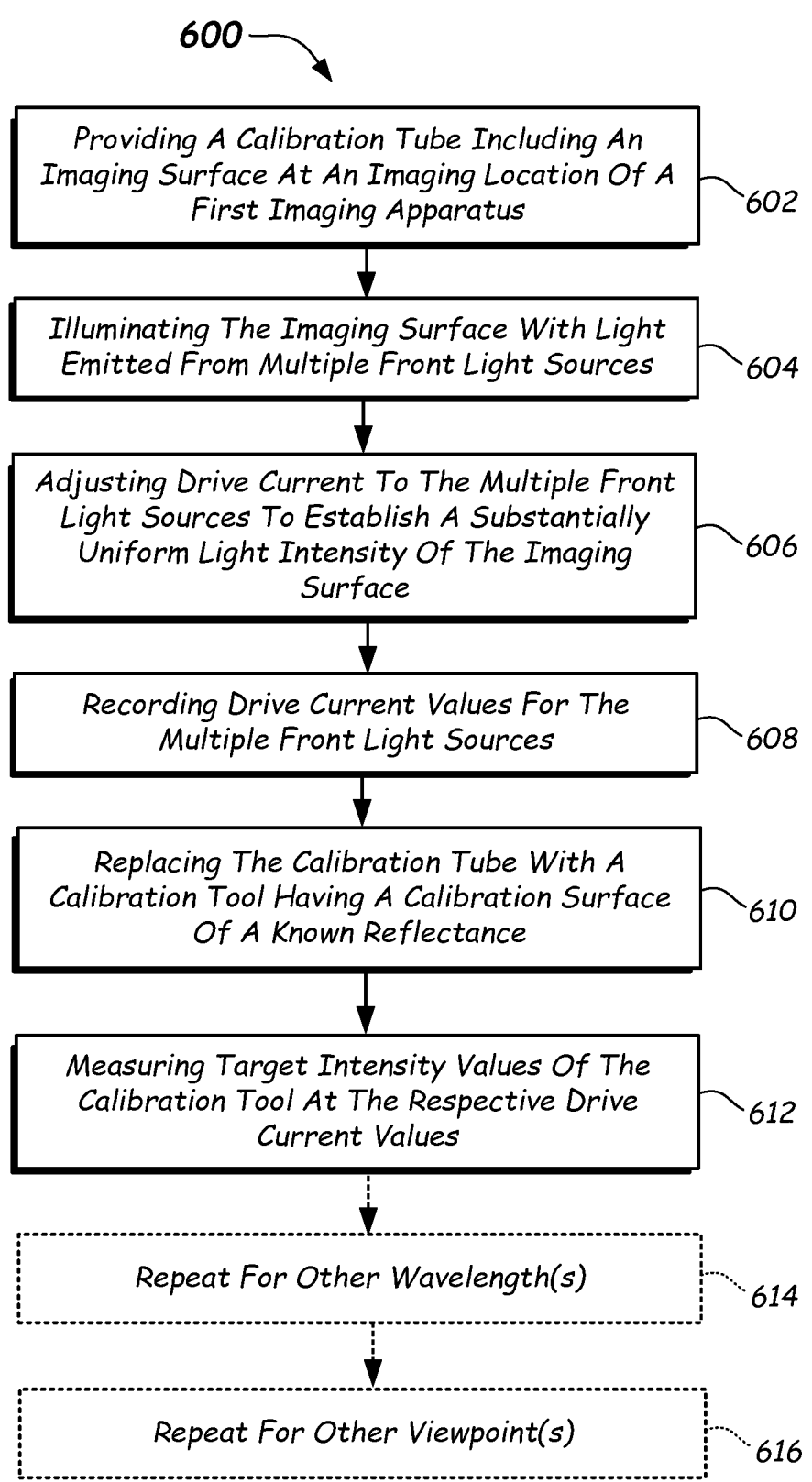

*600 —*

Providing A Calibration Tube Including An Imaging Surface At An Imaging Location Of A First Imaging Apparatus — 602

Illuminating The Imaging Surface With Light Emitted From Multiple Front Light Sources — 604

Adjusting Drive Current To The Multiple Front Light Sources To Establish A Substantially Uniform Light Intensity Of The Imaging Surface — 606

Recording Drive Current Values For The Multiple Front Light Sources — 608

Replacing The Calibration Tube With A Calibration Tool Having A Calibration Surface Of A Known Reflectance — 610

Measuring Target Intensity Values Of The Calibration Tool At The Respective Drive Current Values — 612

Repeat For Other Wavelength(s) — 614

Repeat For Other Viewpoint(s) — 616

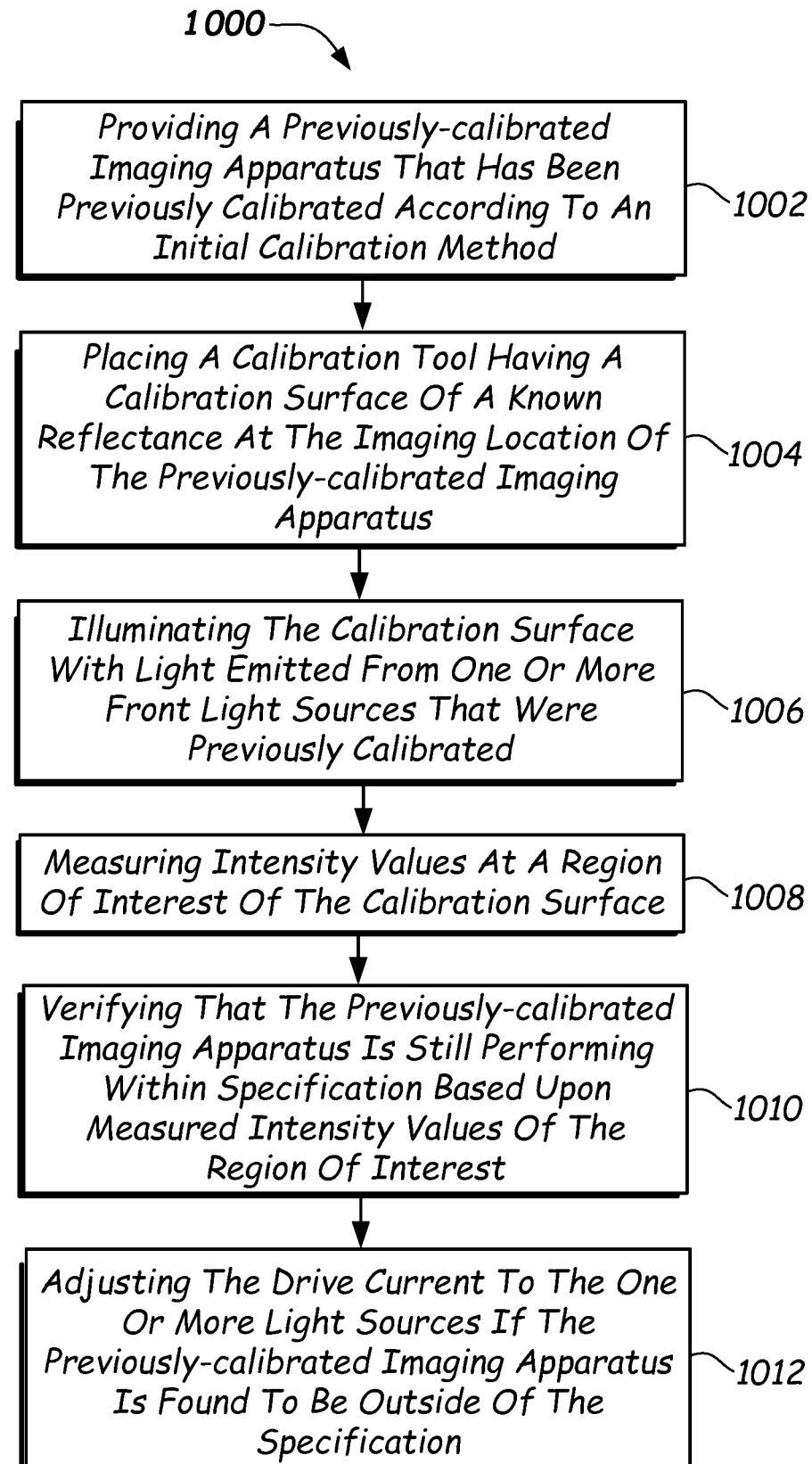

1000

Providing A Previously-calibrated Imaging Apparatus That Has Been Previously Calibrated According To An Initial Calibration Method
1002

Placing A Calibration Tool Having A Calibration Surface Of A Known Reflectance At The Imaging Location Of The Previously-calibrated Imaging Apparatus
1004

Illuminating The Calibration Surface With Light Emitted From One Or More Front Light Sources That Were Previously Calibrated
1006

Measuring Intensity Values At A Region Of Interest Of The Calibration Surface
1008

Verifying That The Previously-calibrated Imaging Apparatus Is Still Performing Within Specification Based Upon Measured Intensity Values Of The Region Of Interest
1010

Adjusting The Drive Current To The One Or More Light Sources If The Previously-calibrated Imaging Apparatus Is Found To Be Outside Of The Specification
1012

FIG. 10

METHODS AND APPARATUS PROVIDING CALIBRATION OF FOREGROUND ILLUMINATION FOR SAMPLE CONTAINER CHARACTERIZATION

CROSS REFERENCE TO RELATED APPLICATION APPLICATIONS

This disclosure is a 371 of PCT/US2020/056924, filed Oct. 22, 2020, which claims the benefit of U.S. Provisional Patent Application No. 62/929,068, entitled "METHODS AND APPARATUS PROVIDING CALIBRATION OF FOREGROUND ILLUMINATION FOR SAMPLE CONTAINER CHARACTERIZATION," filed Oct. 31, 2019, the disclosures of which are hereby incorporated by reference in their entireties for all purposes.

FIELD

The present disclosure relates to imaging methods and imaging apparatus adapted to image a sample container, and more particularly to methods and apparatus for calibrating such imaging apparatus.

BACKGROUND

Automated testing systems may conduct clinical chemistry or assays using one or more reagents to identify an analyte or other constituent in a biological sample (sample) such as blood serum, blood plasma, urine, interstitial liquid, cerebrospinal liquids, and the like. For convenience and safety reasons, these samples are almost always contained in sample containers or tubes (hereinafter used interchangeably). The sample tubes may be capped, and in some cases the caps may include a color and/or shape that provides information concerning the type of test to be conducted, type of additive contained in the tube (e.g., serum separator, coagulant such as thrombin, anticoagulant and specific type thereof, such as EDTA or sodium citrate, or an anti-glycosis additive), and/or whether the sample tube is provided with vacuum capability, and the like.

Improvements in automated testing have been accompanied by corresponding advances in automated pre-analytical sample processing such as batch preparation, centrifugation of sample to separate sample constituents, cap removal (de-capping) to facilitate sample access, aliquot preparation, and pre-screening for hemolysis (H), icterus (I), and/or lipemia (L) (hereinafter referred to as "HIL"), or normality (N), and/or the presence of an artifact in the sample such as a clot, bubble, or foam. Such automated pre-analytical sample processing may be part of a Laboratory Automation System (LAS). In some cases the LAS automatically transports the samples contained in sample tubes for pre-analytical sample processing, as well as on to analytical stations containing clinical chemistry analyzers and/or assay instruments (individually and collectively referred to as "analyzers" herein) for testing. The testing involves a reaction that generates a change, such as fluorescence or luminescence emission that may be read and/or otherwise manipulated to determine a presence and/or a concentration of an analyte or other constituent contained in the sample.

The LAS may handle any number of different samples contained in labeled sample tubes (e.g., including a barcode label) at one time, and the sample tubes may be of all different sizes and types, including different cap types and colors, which may also be intermingled. The LAS can automatically transport the sample tubes for pre-analytical processing operations, all prior to the sample actually being subjected to clinical analysis or assaying by the one or more analyzers.

In some embodiments of automated pre-analytical sample processing, a quality check module may receive a sample tube including a sample therein and pre-screen the sample for the presence of an interferent, such as HIL. The pre-screen for HIL involves capturing one or more digital images of the sample tube and sample and then processing this image data to determine if H, I, and/or L is present, and possibly indexes (relative amounts) for H, I, and/or L if present, or may determine that the sample is normal (N). The presence of an interferent in the sample may possibly adversely affect the test results of the analyte or constituent measurement later obtained from the analyzer.

In certain HILN pre-processing systems, the sample container and sample are digitally imaged and processed, such as with a computer-aided, model-based system, such as by using artificial intelligence, so that the presence or absence of an interferent (HIL) or normality (N) can be determined. The type and color of the cap can also be discerned. During imaging, images of the sample tube (including cap) and sample can be captured from multiple viewpoints. As part of the pre-screening process, the size and type of the sample container and the amount of sample present may also be characterized.

However, such imaging systems may, under certain conditions, provide variations in performance, and even variations in performance from one imaging system to the next. Thus, improved methods and apparatus operational to conduct imaging such samples and/or sample containers are sought.

SUMMARY

According to a first aspect, a calibration method is provided. The calibration method includes providing a calibration tube including an imaging surface at an imaging location of a first imaging apparatus; illuminating the imaging surface with light emitted from multiple front light sources; adjusting a drive current to each of the multiple front light sources to establish a substantially uniform intensity of the imaging surface; recording drive current values for the multiple front light sources; replacing the calibration tube with a calibration tool having a calibration surface of a known reflectance; and measuring target intensity values of the calibration tool at the respective drive current values.

In another aspect, a quality check module is provided. The quality check module includes an imaging location within the quality check module configured to receive a sample container to be characterized; imaging devices configured to capture images of the imaging location from multiple viewpoints; multiple light sources configured to provide front lighting for the imaging devices; a calibration tube including imaging surfaces located at the imaging location during a first calibration stage; and a calibration tool having multiple calibration surfaces of a known reflectance located at the imaging location during a second calibration stage, respective calibration surfaces of the multiple calibration surfaces are arranged to be viewed from each of the multiple viewpoints.

In another aspect, a calibration method is provided. The calibration method includes providing a previously-calibrated imaging apparatus that has been previously calibrated according to an initial calibration method; placing a calibration tool having a calibration surface of a known reflectance at an imaging location of the previously-calibrated imaging apparatus; illuminating the calibration surface with light emitted from one or more front light sources previously calibrated; measuring intensity values at a region of interest of the calibration surface; and verifying that the previously-calibrated imaging apparatus is still performing within specification based upon measured intensity values of the region of interest.

Still other aspects, features, and advantages of the present disclosure may be readily apparent from the following description illustrating a number of example embodiments. The present invention may also be capable of other and different embodiments, and its several details may be modified in various respects, all without departing from the scope of the present disclosure. Moreover, while specific advantages have been enumerated, various embodiments may include all, some or none of the enumerated advantages. The disclosure is to cover all modifications, equivalents, and alternatives falling within the scope of the claims.

BRIEF DESCRIPTION OF THE DRAWINGS

The drawings, described below, are for illustrative purposes and are not necessarily drawn to scale. The drawings are not intended to limit the scope of the invention in any way. Accordingly, the drawings are to be regarded as illustrative in nature, and not as restrictive.

FIG. 6 illustrates flowchart of a calibration method adapted to calibrate an imaging apparatus according to one or more embodiments.

FIG. 10 illustrates flowchart of a calibration method enabling a health check of a previously-calibrated imaging apparatus according to one or more embodiments.

DETAILED DESCRIPTION

Figure 1:
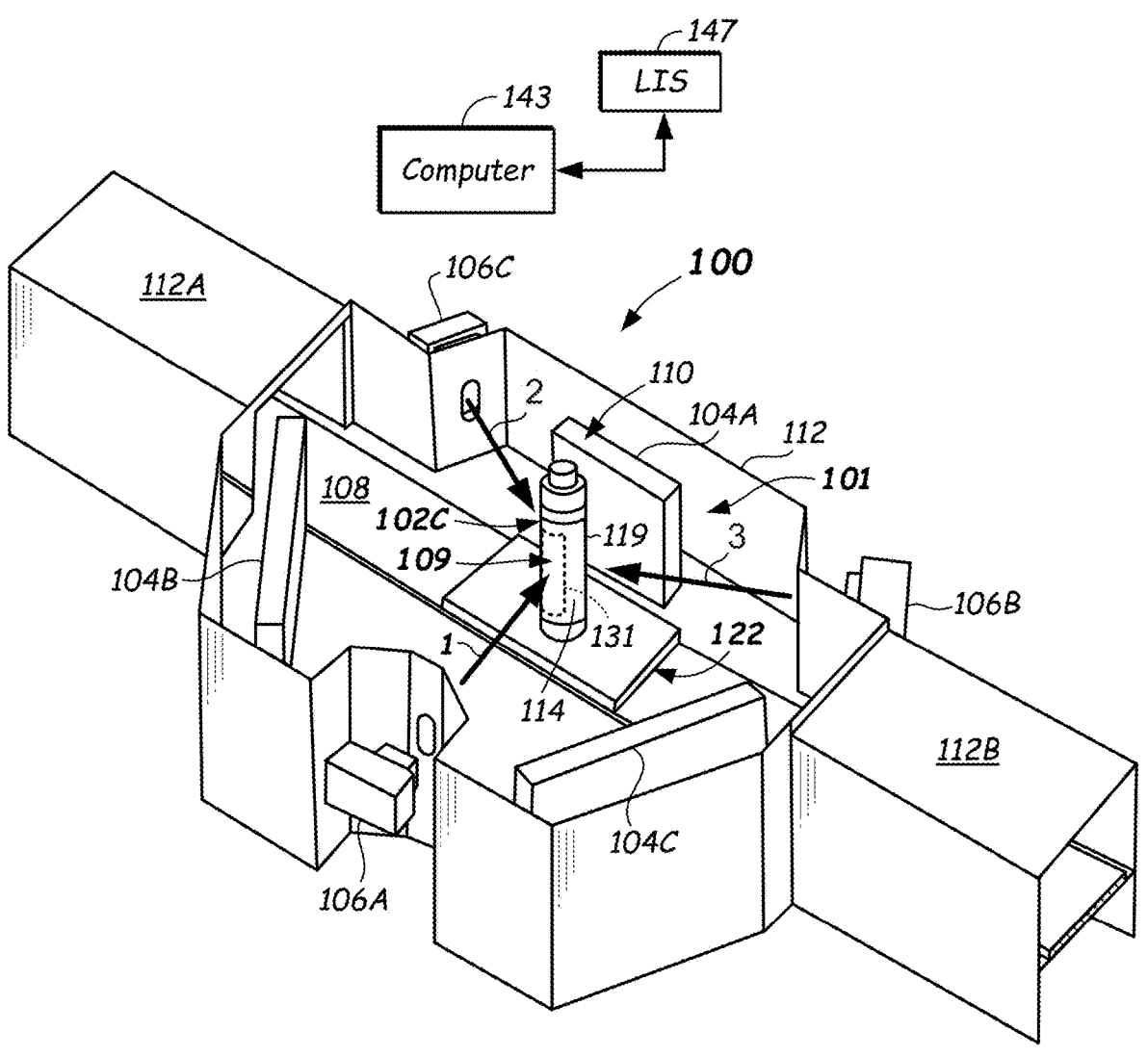
FIG. 1 illustrates a top perspective schematic view of a quality check module including an imaging apparatus configured to carry out a calibration method according to one or more embodiments.

Foreground illumination is used for sample container (e.g., sample tube) characterization, and especially for identifying sample container type and/or properties based on cap color and/or cap appearance (cap shape). According to embodiments, the disclosure relates to methods and apparatus that are setup and used to carry out calibration of foreground illumination, such as within a sample tube characterization apparatus (e.g., with a quality check apparatus) to ensure consistent and accurate foreground illumination. Improving foreground calibration can improve the discrimination capability concerning at least cap color.

In some embodiments, the disclosure relates to methods and apparatus that are setup and used to carry out foreground illumination calibration across multiple sample tube characterization systems (e.g., across multiple quality check apparatus or like imaging machines). Foreground illumination, as used herein, means illumination of a front part of a sample tube by one or more illumination sources (e.g., light panels) positioned at locations in front of the sample tube. For example, in some embodiments, foreground illumination may include foreground lighting from multiple illumination devices (e.g., multiple lighting panels), which may be located at different locations in front of the sample tube, such as on opposite front sides of an imaging device.

In a first broad aspect, embodiments of the present disclosure provide methods and apparatus configured and adapted to calibrate foreground illumination in an optical imaging apparatus. The present disclosure is particularly useful in sample tube quality check apparatus that involve foreground illumination of a sample tube located at an imaging location therein. For example, foreground illumination can be used to illuminate a cap on a sample tube, image the cap, and then discriminate cap color and/or cap shape.

Further, embodiments of the present disclosure provide methods and apparatus that are configured to calibrate an illumination apparatus of an imaging apparatus so that the imaging apparatus can capture one or more images of a sample tube, wherein the one or more captured images can be used to characterize one or more features of the sample tube, such as a cap color and/or cap type, for example. Tube size (height and/or width) may also be characterized using foreground illumination. In quality check apparatus, a check of the quality of the specimen and sample tube are utilized to ensure appropriateness or the alignment of one or more tests to be performed on the sample contained in the sample tube with the type of the sample tube. For example, if the discriminated color of the cap and/or a shape of the cap are not in complete alignment with the test to be conducted, an error can be flagged to the operator/technician. For example, the phlebotomist may have, by mistake, used an inappropriate tube type for the test that has been ordered. For example, a coagulant-containing sample tube may have been used when an anticoagulant-containing sample tube was called for in the specific test to be run. Improved characterization of the cap type and/or shape may aid in detecting these incorrect scenarios. Thus, the sample can be averted before being sent to the analyzer, thus saving analyzer resources and possibly averting tests that may have yielded errant results. In other embodiments, sample tube characterization may be used for automated tube sorting.

In particular, embodiments of the disclosure are directed at calibration apparatus and calibration methods configured to provide image data from one or more imaging devices that have been appropriately calibrated. In further embodiments, methods and apparatus enabling rapid calibration of one or more (multiple) like imaging apparatus (e.g., substantial clones of a master imaging apparatus) are provided.

To ensure the consistent lighting across multiple imaging apparatus (machines) and across imaging devices contained within each imaging apparatus, it is proposed to conduct the foreground illumination in multiple stages. In a first stage, a golden device setting is achieved. In another stage a device-dependent setting is provided with a calibration tool. In yet another, a device-dependent setting can be provided without a tool. In other embodiments, a health check may be provided to confirm calibration or adjust calibration if outside of pre-established specifications.

Figure 2:
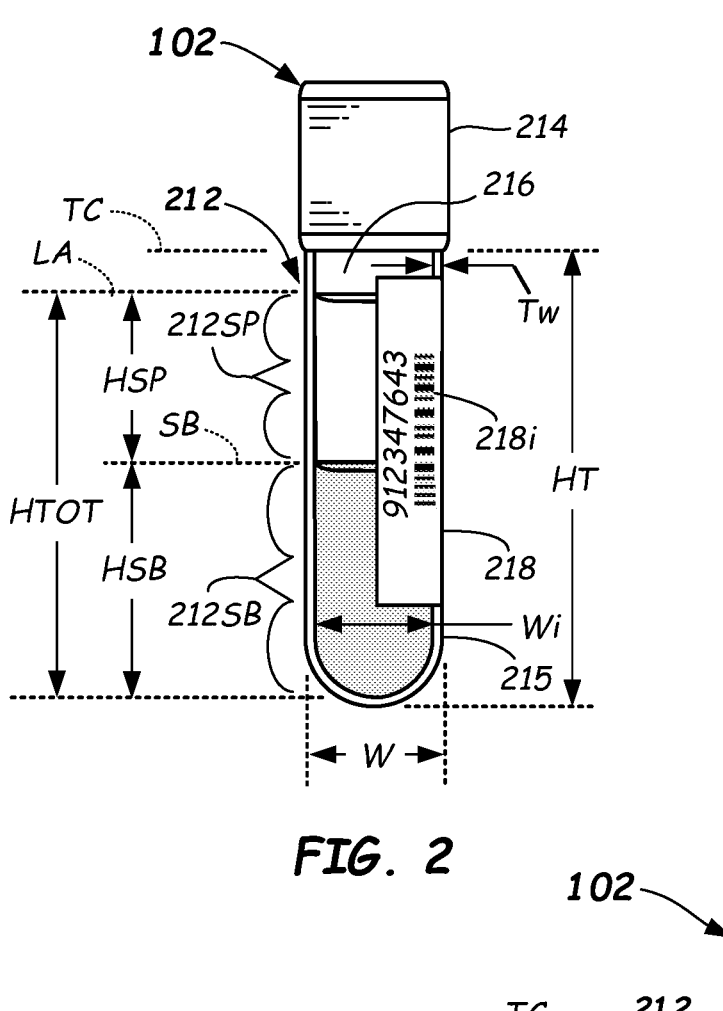
FIG. 2 illustrates a side plan view of a sample tube containing a separated (e.g., centrifuged) sample and a first cap type therein.
Figure 3:
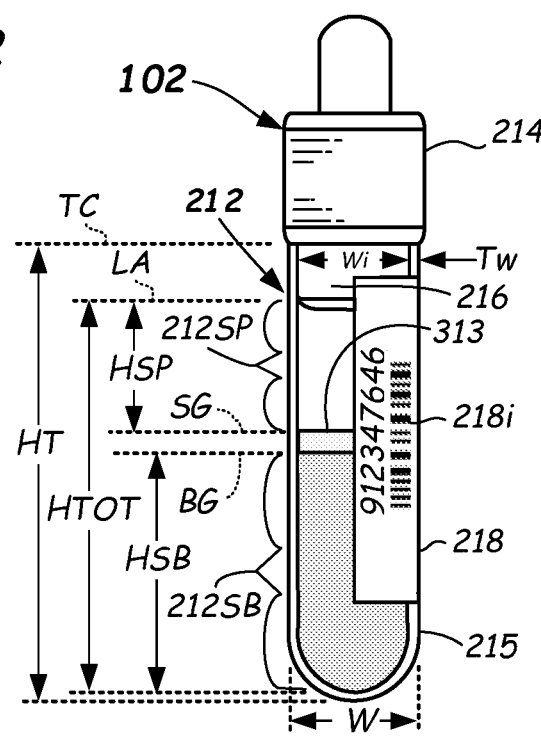
FIG. 3 illustrates a side view of a sample container containing a separated (e.g., centrifuged) sample therein and further including a gel separator and including a second cap type.

In some embodiments, a sample 212 (specimen), as described herein, is collected in a sample tube 102, such as a blood collection tube and may be whole blood that includes a settled blood portion 212SB and a serum and plasma portion 212SP after separation (e.g., after fractionation using centrifugation as is shown in FIGS. 2 and 3. The settled blood portion 212SB (sometimes referred to as the "packed cell portion") is made up blood cells such as white blood cells (leukocytes), red blood cells (erythrocytes), and platelets (thrombocytes), which are aggregated and separated from the serum or plasma portion 212SP. The settled blood portion 212SB is generally found at the bottom part of the sample tube 102. The serum or plasma portion 212SP is the liquid component of blood that is not part of the settled blood portion 212SB. It is generally found above the settled blood portion 212SB. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components or a coagulant. In some sample tubes 102, a small (e.g. plug) may be used, which positions itself between the settled blood portion 212SB and the serum or plasma portion 212SP during fractionation as shown in FIG. 3. Gel separator 313 serves as a barrier between the two portions. The types of specimen present can be related to cap color and/or cap shape.

In accordance with one or more embodiments, the calibrated apparatus and calibration methods described herein may be used to calibrate an imaging apparatus that is configured to carry out pre-analytical testing (pre-screening). For example, in one or more embodiments, the apparatus and methods may be carried out to precisely calibrate an optical imaging apparatus. In particular, one or more embodiments of the present disclosure provide for calibration of an optical imaging apparatus that is configured to characterize a sample and/or sample tube as a prerequisite to further testing. For example, the sample may be pre-screened for the presence of Hemolysis (H), Icterus (I), and/or Lipemia (L), or normality (N), collectively referred to as HIL.

Shown in FIG. 1 is an embodiment of a sample tube quality check apparatus 100 with which the calibration methods according to this disclosure can be used. FIG. 1 shows an example of the optical imaging system 101 within the quality check apparatus 100 including multiple light sources (e.g., light panels 104A-104C) and multiple imaging devices 106A-106C. In some operations, the light panels 104A-104C are mainly used to back illuminate the sample tube 102, i.e., lighting from the back side of the sample tube 102 so the imaging device (e.g., camera, CMOS sensor, or the like) can inspect a fluid property of the sample 212 contained in the sample tube 102 (note a calibration tube 102C, described further below, is shown in place of a sample tube 102 in FIG. 1). Inspection can be conducted from multiple viewpoints 1, 2, 3. In backlighting, the relevant imaging device is provided on the front side of the sample tube 102 and the lighting source is provided behind the sample tube 102. The fluid property may be HILN, a volume or dimension of one or more of the components of the sample 212, or the presence of an artifact (e.g., clot, foam, bubble) therein, for example. Foreground illumination is the topic of this calibration method, as opposed to back illumination.

Figure 4A:
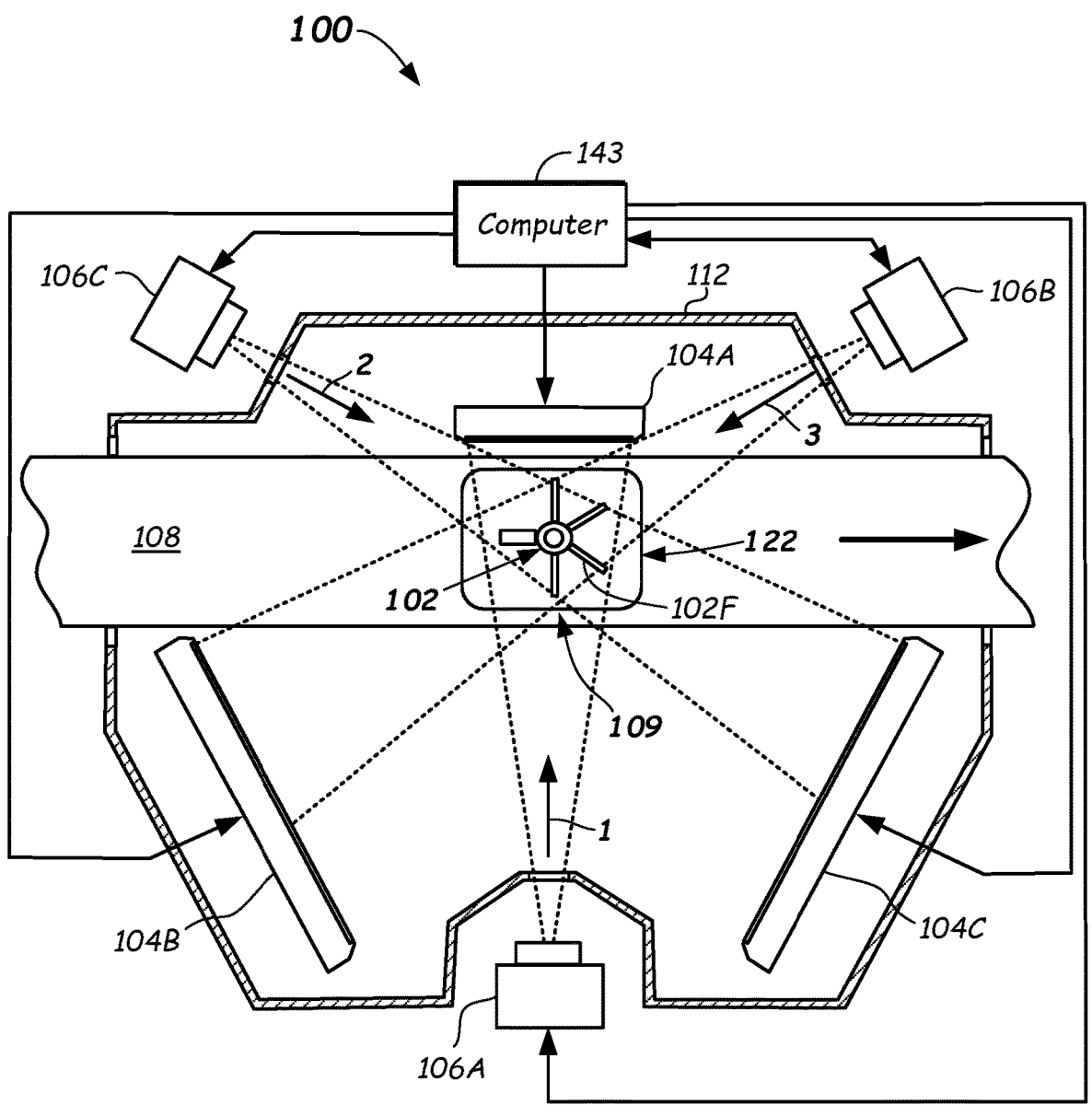
FIG. 4A illustrates a top view of a quality check module (with top removed for illustration purposes) including imaging apparatus and a calibration tube located at the imaging location according to one or more embodiments.
Figure 4B:
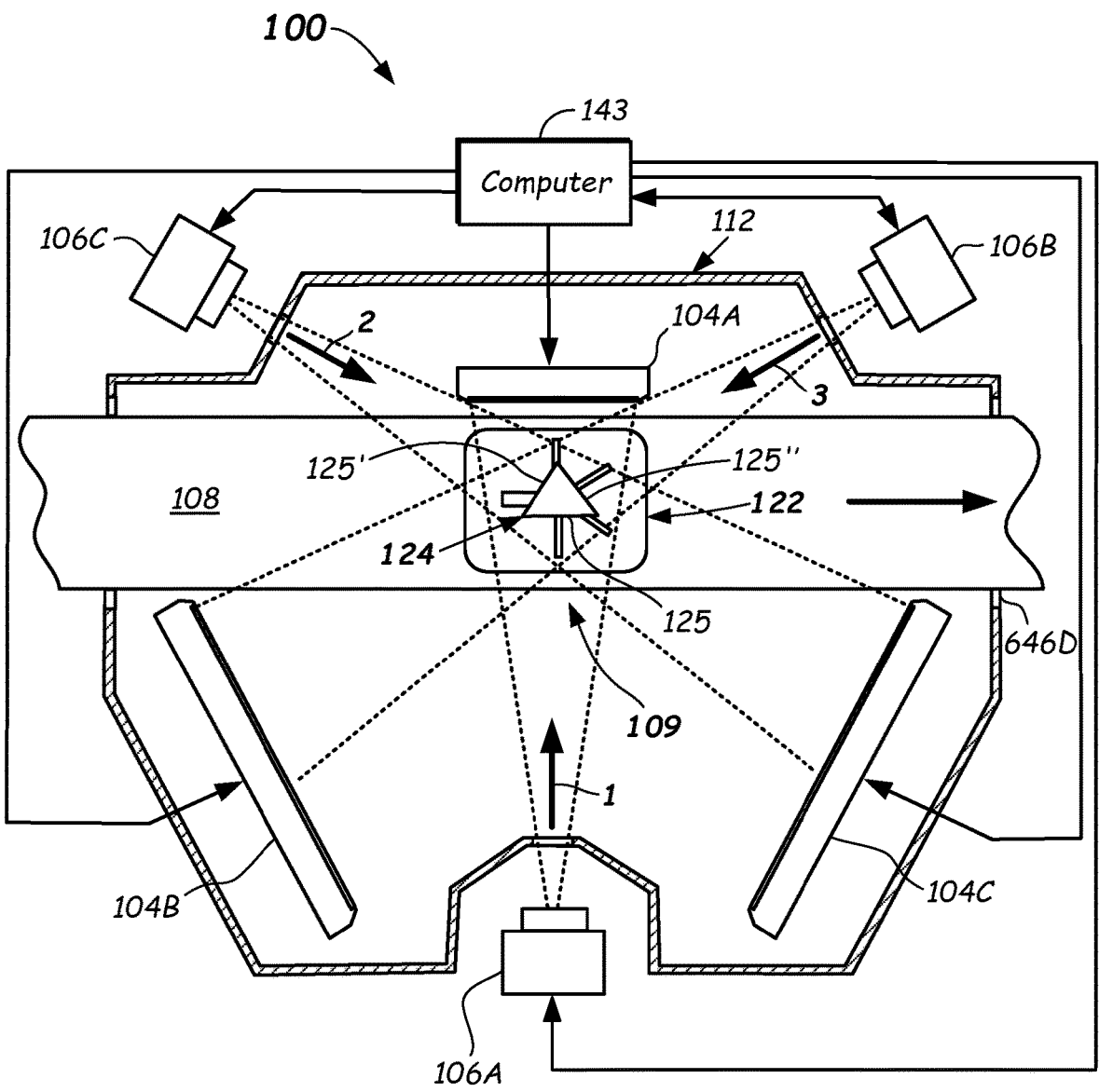
FIG. 4B illustrates a top view of a quality check module (with top removed for illustration purposes) including a calibration tool installed at the imaging location according to one or more embodiments.

With the same illumination setup (configuration) that can be used for back illumination, the light panels 104A facing the imaging device 106A and the sample tube 102 can be turned off, while turning on the other two light panels 104B and 104C in front of the sample tube 102 in order to provide the frontal illumination of the sample tube 102 (see FIG. 4A). The frontal illumination is most useful for characterization of physical features of the sample tube 102. Characterization of the physical features of the sample tube 102 can include determining a size (e.g., height and/or width of the sample tube 102), determining a color of the cap 214, a type of the cap 214, and/or reading of a barcode and/or other indicia (collectively 218i-See FIGS. 2-3) provided on a label 218 applied to, or provided on, the sample tube 102. While tube characterization operations such as a reading of the barcode 218i may not have a strict consistency requirement as long as there is sufficient front lighting provided, there are some features of tube type categorization such as those based on cap color and/or cap appearance where consistent lighting, and in particular, across multiple imaging apparatus (machines) can ensure proper performance and characterization thereof.

As shown in FIG. 1, the light panels 104A-104C and imaging devices 106A-106C can be arranged to capture and provide lateral 2D images of the sample container 102, and possibly of the sample 212 if contained therein, from one or more different lateral viewpoints (e.g., three viewpoints 1, 2, and 3, as shown). During image capture for sample characterization, the sample container 102 and sample 212 may be backlight illuminated, i.e., illuminated behind the sample container 102 and sample 212 for each viewpoint 1-3. The illumination produced may be from light panels 104A-104C. For example, backlighting may be provided for imaging device 106A by light panel 104A, for imaging device 106B by light panel 104B, and for imaging device 106C by light panel 104C. In backlighting, the sample tube 102 is positioned between the respective light panel 104A-104C and the respective imaging device 106A-106C for each respective viewpoint 1-3. Back lighting with the light panels 104A-104C can be coupled with high dynamic range (HDR) image processing of the image taken by the imaging devices 106A-106C and processing thereof by computer 143. A characterization method and apparatus 100 may be used to quantify the sample 212, including quantification of intensities of light transmission through the sample at various spatial locations.

In some embodiments, the characterization methods and apparatus may be used to determine a location of the interface boundaries of the serum or plasma portion 212SP and/or the settled blood portion 212SB, and/or gel separator 313 (if present), as well as the volume and/or depth of these respective components with great precision using image processing (e.g., HDR image processing) together with back illumination and/or foreground illumination. In some embodiments, characterization of the physical (geometrical) or other features of the sample tube 102 may be determined using the characterization apparatus and methods described herein, such as the tube type (via identification of height and/or width thereof), the cap type, and/or the cap color. According to some embodiments, the characterization methods involve identification of cap type and cap color, and optionally tube size (height and/or width). The characterization methods to identify of cap type and cap color, and optionally tube size (height and/or width) can use fore (front) lighting with front light sources such as with combinations of light panels 104A-104C, depending upon the viewpoint of interest for each front image capture that is carried out.

In short, the illuminated 2D image data sets for one or more viewpoints (e.g., viewpoints 1, 2, and/or 3) may be used to characterize the sample container 102 and/or quantify the sample 212. In particular, foreground illuminated 2D image data sets for one or more viewpoints may be used to characterize the sample container 102 to determine, for example, the tube type and cap type and color thereof, and possibly other geometric features of the sample container 102 and/or sample 212. 2D image data sets obtained with back lighting with the light panels 104A-104C may also be used to determine or verify information about the sample 212, such whether an interferent, such as hemolysis (H), icterus (I), and/or lipemia (L) (hereinafter "HIL") is present in the sample, or if the sample is normal (N), or even the presence of an artifact (e.g., clot, foam, or bubble) contained therein.

Again referring to FIG. 1, in one or more embodiments, the quality check module 100 may be provided as part of the LAS. The LAS can include a track 108 that functions to transport the sample 102 to one or more analyzers (not shown) of the LAS, and to the quality check module 100 that can be provided at any suitable location on or along the track 108. For example, the quality check module 100 may be located at a loading station, adjacent to or part of an analyzer, or elsewhere along the track 108, so that the sample 212 and sample container 102 can be characterized.

In certain embodiments, the characterization can take place while the sample container 102 is residing on a carrier 122 moveable along the track 108 (see also FIG. 4A). However, to be clear, the quality check module 100 including back lighting and fore lighting may not be included on a track 108 and the sample container 102 including the sample 212 may be loaded and unloaded from the quality check module 100 either manually or with the action and assistance of a robot.

In some embodiments, the characterization may include data processing (e.g., of HDR image processing) including capturing multiple images at multiple exposures (e.g., exposure times and/or aperture settings) and with both background and foreground illumination. The image processing may involve using multiple different spectra having different nominal wavelengths (e.g., colors) of illumination. The multiple images may be obtained using the imaging devices 106A-106C for the multiple viewpoints 1-3, with front illumination and back illumination.

The images may be produced using panelized illumination using respective ones of light panels 104A-104C for each viewpoint 1-3. The spectral light sources for back and front illumination may include red (R) light sources, green (G) light sources, and blue (B) light sources. Optionally, white light (W), near-infrared (NIR), or even infrared (IR) light sources may be used. Images at multiple exposures for each spectrum may be obtained by the quality check module 100. For example, 4-8 images at different exposures (e.g., exposure times and/or aperture settings) may be obtained at each spectrum (or wavelength range). These multiple images at different spectrums may then be further processed by computer 143 to generate characterization results. Any suitable segmentation and/or characterization method may be used for characterization of the sample container 102, such as disclosed in US Patent Application Pubs. US2018/0365530 and US2019/0041318, for example.

As part of the image processing, calibration is carried out to suitably adjust image intensities to ensure that the fore lighting and/or back lighting is of the proper intensity for each spectrum of light used for illumination. Further details of the calibration methods of imaging apparatus of quality check module(s) will be described with reference to FIGS. 1-11C herein.

Typically, a sample 212 (FIGS. 2 and 3) to be automatically processed may be provided in a sample container 102, which may be capped with a cap 214 (FIGS. 2 and 3). The cap 214 may have different shapes and/or colors (e.g., red, royal blue, light blue, dark green, light green, black, grey, tan, orange, or yellow, or combinations of colors), which may have meaning in terms of what test the sample container 102 is used for, the type of additive contained therein, whether the specimen should be under a vacuum, or the like. Other colors or combinations of colors with meanings may be used. According to one aspect, it may be desirable to image the cap 214 to characterize information about the cap 214 so that it can be used to perform a cross check with test orders and verify that the correct sample tube 102 was indeed used for the test that was so ordered.

Each of the sample containers 102 may be provided with identification information 218i (i.e., indicia), such as a barcode, alphabetic, numeric, alphanumeric, or combination thereof that may be machine readable. The identification information 218i may indicate, or may otherwise be correlated, via a Laboratory Information System (LIS) 147 or other database, to a patient's identification as well as tests to be carried out on the sample 212, or other information from a laboratory information system (LIS), for example. Such identification information 218i may be generally provided on a label 218 adhered to, or otherwise provided on the side of, the sample container 102. The label 218 generally does not extend all the way around the sample container 102, or all along a height of the sample container 102. In some embodiments, multiple labels 218 may be adhered, and may slightly overlap each other. Accordingly, although the label 218 may occlude a view of a portion of the sample 212, some portion of the sample 212 may still be viewable from certain viewpoints (one or more of viewpoints 1-3). One or more embodiments of the characterization method and quality check module 100 can enable the characterization of the sample 212 and/or sample container 102 without rotation of the sample container 102, by imaging the sample container 102 and sample 212 from multiple viewpoints (e.g., from all viewpoints 1, 2, and 3, for example).

As best shown in FIGS. 2 and 3, the sample 212 may include a serum or plasma portion 212SP and a settled blood portion 212SB contained within the tube 215. Air 216 may be provided above the serum or plasma portion 212SP and a line of demarcation between the air 216 and the serum or plasma portion 212SP is defined herein as a liquid-air interface (LA). A line of demarcation between the serum or plasma portion 212SP and the settled blood portion 212SB is defined herein as a serum-blood interface (SB), and is shown in FIG. 2. An interface between the air 216 and the cap 214 is referred to herein as a tube-cap interface (TC). A height of the serum or plasma portion 212SP is (HSP) and is defined as a height from a top of the serum or plasma portion 212SP at LA to a top of the settled blood portion 212SB at SB in FIG. 2. A height of the settled blood portion 212SB is (HSB) and is defined as a height from a bottom of the settled blood portion 212SB to a top of the settled blood portion 212SB at SB in FIG. 2. HTOT in FIG. 2 is a total height of the sample 212 and is defined as HTOT=HSP+HSB.

In cases where a gel separator 313 is used (see FIG. 3), a height of the serum or plasma portion 212SP is (HSP) and is defined as a height from the top of the serum or plasma portion 212SP at LA to the top of the gel separator 313 at SG. A height of the settled blood portion 212SB is (HSB) and is defined as a height from the bottom of the settled blood portion 212SB to the bottom of the gel separator 313 at BG. HTOT in FIG. 3 is the total height of the sample 212 and is defined as HTOT=HSP+HSB+height of the gel separator 313.

In each case, the wall thickness is Tw, the outer width is W, and the inner width of the sample container 102 is Wi. A height of the tube (HT) is defined herein as the height from the bottom-most part of the tube 215 to the bottom of the cap 214. Characterization methods may determine any of these geometrical attributes, such as disclosed in US Pat. Pubs. US2018/0364268, US2018/0365530, US2018/0372648, US2019/0271714, and US2019/0041318, for example.

As discussed above, carriers 122 may move the sample containers 102 along the track 108 and stop at an imaging location 109 in the quality check apparatus 100. Carriers 122 can be passive, non-motored pucks that may be configured to carry a single sample container 102 on the track 108, where the track 108 is movable, or carrier 122 may be automated including an onboard drive motor that may be programmed to move about the track 108 and stop at pre-programmed locations, such as at the imaging location 109. In either case, the carriers 122 may each include a holder (not shown in FIG. 1, but shown in FIG. 4A) configured to hold the sample container 102 in an approximately upright orientation so that it can be readily imaged from multiple viewpoints (e.g., from viewpoints 1-3). The holder may include a plurality of fingers or leaf springs, or combinations thereof that may support and secure the sample container 102 upright in the carrier 122, but where some of which may be laterally movable or flexible to accommodate for different sizes (widths) of the sample containers 102 to be received therein.

Quality check apparatus 100 may be controlled by the computer 143, which may be a microprocessor-based central processing unit (CPU), having a suitable memory and suitable conditioning electronics, drivers, and software for operating the various automated apparatus components. Computer 143 may control operation of the quality check apparatus 100 and the characterizations, processing, and imaging, including the operation of the light panels 104A-104C and imaging devices 106A-106C, as well as operation of the track 108 described herein. Optionally, track may be controlled by a different computer or controller in communication with computer 143.

Pre-screening the sample 212 allows for accurate quantification of the relative amounts of the serum or plasma portion 212SP and/or the settled blood portion 212SB, and/or a ratio there between. Further, pre-screening may determine physical vertical locations of TC, LA, SB or SG and BG, and/or a bottom-most part of sample container 102. Quantification ensures that the sample 212 can be stopped from progressing on to the one or more analyzers, if an insufficient amount of serum or plasma portion 212SP is available to carry out the ordered tests. In this way, inaccurate test results may be avoided via avoiding the possible aspiration of air, settled blood portion 212SB and/or gel separator 313. Thus, the ability to accurately quantify the physical location of LA and SB or SG may minimize not only the possibility of aspirating air, but also minimize the possibility of aspirating either settled blood portion 212SB or gel separator 313 (if present). Thus, clogging and contamination of the sample aspirating pipette (not shown) used to aspirate serum or plasma portion 212SP for the analyzers or at an aliquoting station may be avoided or minimized. As discussed above proper characterization of the cap 214 and/or tube 102 can allow for an additional quality check to ensure proper sample tube usage for the tests that are ordered.

With reference to FIGS. 1 and 4A-4E, a first embodiment of a quality check apparatus 100 including lighting sources embodied as a light panel assemblies 104A-104C, which may include spectrally-switchable light sources, is shown and described. The images obtained by the quality check apparatus 100 may allow for precise aspiration pipette and/or gripper positioning, determination that a sufficient amount (e.g., volume or height) of the serum or plasma portion 212SP is available for the tests that have been ordered, the identification of H, I, and/or L or N (hereinafter HILN), identification of an artifact such as a clot, bubble or foam in the sample 212, and characterization of the cap color and/or cap type and/or tube to verify tube type and size. Thus, using the quality check module 100 may help avoiding gripper crashes, pipette clogging, air aspiration by the pipette, identify HILN, identify artifacts, and/or determine via cap characterization and/or tube size that an appropriate sample tube 102 was utilized for the test ordered, such that valuable analyzer resources are not wasted and that confidence in the test results may be improved.

Now referring to FIG. 4A, an embodiment of a quality check apparatus 100 is shown. Quality check apparatus 100 may include imaging devices 106A-106C configured to capture one or more digital images (i.e., one or more pixelated images) at the imaging location 109 from multiple lateral viewpoints (e.g., from viewpoints 1-3). Imaging devices 106A-106C may be digital cameras, charged coupled devices (CCD), arrays of photodetectors, CMOS sensors, or the like. Other suitable imaging devices for generating digital, pixelated images may be used. The imaging devices 106A-106C may be capable of taking digital images having any suitable image size so as to capture images including at least the cap 214 and the serum or plasma portion 212SP. Other image sizes may be used.

The imaging devices 106A-106C may be provided in close proximity to, and trained or focused to capture a view window at the imaging location 109 including an expected location of the sample container 102. In some embodiments, the sample container 102 may be placed at or stopped at the imaging location 109, such as by a carrier stopping on the track 108 or being placed in a holder located at the imaging location 109 by a robot (not shown), so that the sample container 102 is approximately located in a center of the view window and at the imaging location 109.

Referring again to FIGS. 1 and 4A-4E, the quality check apparatus 100 may include spectrally-switchable lighting sources 104A-104D, as shown provided by light panel assemblies 104A-104D to enable providing spectrally-switchable lighting (back lighting and/or fore lighting, as desired). The spectrally-switchable lighting sources (e.g., light panels) 104A-104C may be spectrally-switchable between at least two light spectra, and in some embodiments, between 3 or more discreet spectrum. The light sources 104A-104C may be constructed as described in US Pat. Pub. 2018/0372648, for example.

The light arrays in the light panels 104A-104C may provide switchable multi-spectral illumination. For example, in one embodiment, the light arrays may include a plurality of independently-switchable lighting elements, or lighting elements that may be switchable in groups, such as light emitting diodes (LEDs) that have different light emission spectra. The switching of the lighting elements may be accomplished by software operable on the computer 143 coupled with an appropriate power source and drivers. Thus, the light panels 104A-104C may be illuminated at multiple different spectra having different nominal wavelengths by selecting only some of the lighting elements for illumination at a time.

For example, LEDs may include different colored LEDs, such as red LEDs (R), green LEDs (G), and blue LEDs (B) that emit light spectra at different nominal wavelengths. The light panel assemblies 104A-104C may each emit red light at 634 nm+/−35 nm, green at 537 nm+/−35 nm, and blue at 455 nm+/−35 nm, for example. In particular, the light arrays may include clusters of R, G, & B LEDs that may be arranged in a repeating pattern along the height of the light panels 104A-104C. Each of the same-colored LEDs may be illuminated at once for each panel. For example, to accomplish front lighting, each of the red LEDs of a panels (e.g., light panels 104B and 104C) may be turned on simultaneously to provide red illumination from those light panel assemblies to front illuminate the sample container 102 containing sample 212 at the imaging location 109 during imaging thereof. Likewise, each of the green LEDs may be turned on simultaneously to provide green illumination during imaging. Similarly, each of the blue LEDs may be turned on simultaneously to provide blue illumination during imaging. It should be recognized that R, G, and B are only examples, and that other wavelength light sources, such as white light sources (e.g., wavelength range of about 400 nm to about 700 nm) may be selected for certain types of foreground light imaging. In other embodiments, UV (wavelength range of about 10 nm to about 400 nm), near infra-red (wavelength range of about 700 nm to about 1250 nm), or even mid-infrared (wavelength range of about 1250 nm to about 2,500 nm) may be included, and may be switched on at times for certain types of imaging.

Calibration Methods

Referring now to FIG. 6, a flowchart of a calibration method 600 is shown and will be described. The calibration method 600 is useful for calibrating an imaging apparatus, such as the type of imaging apparatus 101 included in the quality check apparatus 100.

At a first stage, a golden device setting is established for the ideal foreground illumination provided on a sample tube 102. For this purpose, a calibration tube 102C (see FIG. 1) of representative diameter (e.g., average of what is expected in-field) with, for example, a blank label 119 (e.g., a single layer of white paper, which may have an adhesive backing) wrapped around the body of the calibration tube 102C to enable the adjustment of the drive current of the foreground illumination until it reaches a preset intensity (say, 180 out of 255 intensity level) at the imaging location 109. The target intensity $I_T$ is chosen to be as close to the maximum as possible, but includes a safety margin to avoid saturation in case of varying conditions, e.g., a label material of higher reflectance used in the field. The adjustment needs to ensure substantially balanced (uniform) light distribution from both sources 104B, 104C from both sides as well as across each of the multiple color channels (wavelengths), despite the cylindrical shape of the sample tubes 102. This first stage can be done either programmatically or manually as it only needs to be done once.

In the depicted embodiment of the method 600, at the first stage, such as in block 602, a calibration tube 102C including an imaging surface 114 may be provided at the imaging location 109. The imaging location 109 is located within the imaging chamber 110 formed by a collection of walls of the housing 112 of the first imaging apparatus 101 (the ceiling of FIGS. 1 and 4A-4B have been removed for illustration purposes). Housing 112 may include one or more tunnels 112A, 112B to allow the carriers 122 to enter into and/or exit from the chamber 110, but may limit entry of exterior light into the chamber 110. In some cases, doors may be provided in tunnels 112A, 112B that can be closed when imaging.

The imaging location 109 may be located within chamber 110 and its center may be located at an intersection point of normal vectors (normal vectors 1, 2, and 3) projected from each of the imaging devices 106A-106C. The imaging surface 114 may be formed, for example, by a blank label 119 thereon. Blank label 119 can be applied to a front surface of the tube body of the calibration tube 102C that is facing the imaging device 106A, but may wrap fully around for the other viewpoints 2-3. In other embodiments, the imaging surface 114 may be painted flat white or another color. The calibration tube 102C may be resident on a calibration carrier or on another suitable carrier or holder, like carrier 122 shown in US Pat. Pub. 2018/0372648, for example. Calibration tube 102C may be otherwise positioned at the imaging location 109.

The method further comprises, in block 604, illuminating the imaging surface 114 with light emitted from multiple front light sources (104B, 104C). This illumination is referred to as "fore lighting" which is direct lighting of the imaging surface 114. According to the method 600, in block 606, a drive current to each of the front light sources 104A, 104B is adjusted to achieve and establish a "substantially uniform" light intensity on the imaging surface 114. "Substantially uniform" light intensity means that the light intensity on the region of interest 131, 1131 (see, e.g., FIGS. 1, 4C, 4E, 5A-B, and 11A-B) at the front 120 degrees (+/−60 degrees from the vector 1) are uniform within +/−20% of the maximum intensity in the region of interest 131, 1131 when measured on a pixel by pixel basis. In some embodiments, the light intensity on the region of interest 131, 1131 can be uniform within +/−10%, +/−5%, or even +/−3% in some embodiments. In some embodiments, the substantially uniform light intensity on the region 1131 of interest 131, 1131 on the imaging surface 114 can be measured by the imaging device 106A for viewpoint 1. Light intensity measurements for the other viewpoints 2, 3 may be made by imaging devices 106B, 106C. Other suitable means for measuring intensity may be used.

Possible alternative intensity measurement solutions could be used to measure whether substantially uniform light intensity is provided on the imaging surface 114. For example, a photometer could be used to manually measure the luminance at the imaging surface 114. A spectrometer may be used to determine and/or verify the color distribution at the imaging surface 114. The adjustment in drive current to each light source 104A, 104B, and 104C may be from an adjustable current or voltage source. Optionally, the methods described herein may adjust the exposure of the sensor of the imaging devices 106B, 106C when the average intensity is either too high or too low from the target intensity (say, 180 out of 255 intensity levels) to avoid drawing too low or too high of a drive current.

As each imaging device (machine) might have slightly different sensor and illumination properties, carrying the drive current to other machines is not guaranteed to reproduce the same foreground illumination. Therefore, it is an aim to reproduce the light intensity at the other machines instead of the drive current.

According to the method 600, once the substantially uniform light intensity on the imaging surface 114 is achieved, the drive current values $C_1$, $C_2$ to each of the front light sources 104B, 104C, respectively, can be recorded in memory of the computer 143 as recorded drive currents in block 608.

Figures 4C, 4D, 4E:
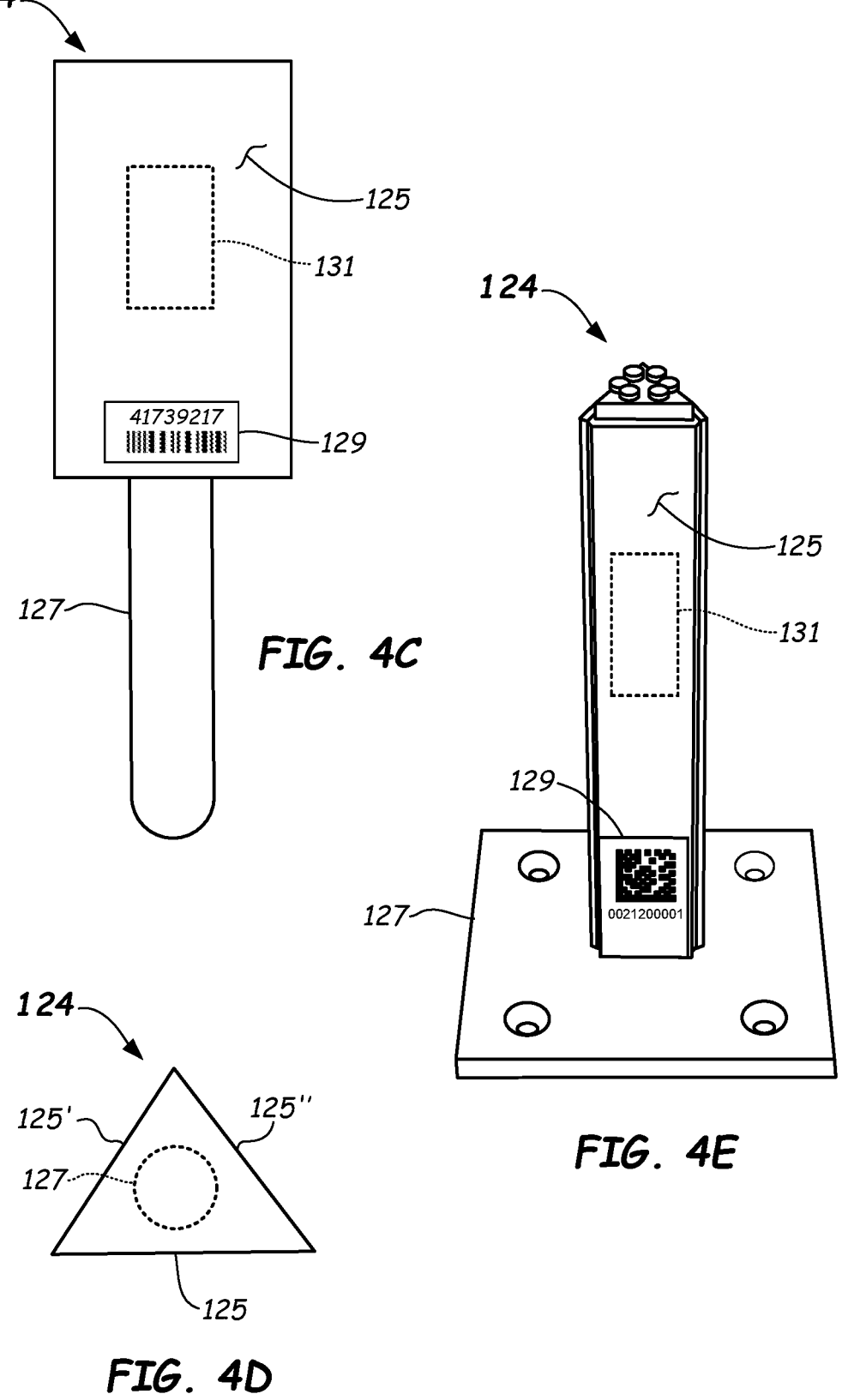
FIG. 4C illustrates a front view of a calibration tool including a calibration surface according to one or more embodiments.
FIG. 4D illustrates a top view of the calibration tool of FIG. 4C illustrating multiple calibration surfaces arranged in a triangle according to one or more embodiments.
FIG. 4E illustrates a front view of another calibration tool including a calibration surface according to one or more embodiments.

Once satisfied that the light setting is substantially uniform, the calibration tube 102C can be replaced with a polygonal object (calibration tool) of a known reflectance on each imaging surface (calibration tool 124) as shown in FIGS. 4C-4D, or optionally FIG. 4E.

"Reflectance" as used herein refers to a surface reflective property that determines the fraction of incident light of a specific wavelength (e.g. Red [~620 nm], Green [~540 nm] or Blue [~450 nm]) that is reflected from the imaging surface to the imaging sensor of the respective imaging device 106A, 106B, 106C or other intensity measuring device. The imaging surface can either have uniformly distributed reflectance where one reflectance value R1 can represent the whole surface's reflectance property, or it can have a varying distributed reflectance for different portions of the imaging surface. By a "known reflectance", as used herein, it is meant that the reflectance value of the imaging surface is known to a relatively high degree of accuracy and precision (e.g., >95%, >97%, or even >99%) either by measurement from a reflectance spectrometer or from manufacturing specification of the surface material. The calibration tool 124 can be designed such that each of the substantially planar sides comprises a calibration surface that is facing one of the imaging devices 106A-106C. Thus, this can lead to a prism shape in the case of using three imaging devices 106A-106C as shown in top view of FIG. 4D, wherein the prism shape comprises calibration surfaces 125, 125', and 125" formed in a triangle, for example. The calibration tools 124 shown herein provides a unique design for implementing calibration in imaging devices 101 for quality check apparatus 100 or other machines wherein sample tubes 102 are to be imaged such as for pre-screening or sorting.

Thus, according to the method 600, in block 610, the calibration tube 102C at the imaging location 109 is replaced with a calibration tool 124. The calibration tool 124 has the calibration surface 125 of a known reflectance R1 value for viewpoint 1. The calibration tool 124 can have a surface of known reflectance that has been certified to facilitate the calibration. Like calibration surfaces 125', 125" of the known reflectance R1 may be provided for viewpoints 2 and 3, respectively. The calibration tool 124 can be configured as shown in FIGS. 4C and 4D wherein the calibration surface 125 is of the known reflectance R1. The calibration tool 124 can include a holding portion 127, which may be in the shape of a bottom of a sample tube 102, so that the calibration tool 124 can be received in a holder of a carrier 122 (see FIG. 4A) and held at the imaging location 109 of the same type of carrier 122 used for characterization of the sample tubes 102. Optionally, the calibration tool 124 can be configured as shown in FIG. 4E and include a holding portion 127, which may be in the shape of a plate so that the calibration tool 124 can be coupled to a calibration carrier at the imaging location 109, or otherwise positioned at the imaging location 109.

The material of the imaging device facing the sides of the calibration tool 124 for viewpoints 1-3 should have the following properties:

A calibrated spectral surface reflectance (R1) by lab measurement,

Nearly constant spectral reflectance (substantially neutral with respect to the wavelength of illumination), Optimized for diffuse reflectance (minimizing shininess), Mean surface reflectance level R1 approximately matched to ensure sufficient, but not exceeding illumination levels at the approximate target drive current settings (e.g., to LEDs of light sources) and exposure time.

The surface reflectance measurements of each individual calibration surface 125, 125', and 125" of each calibration tool 124 can be accessible in a database, and linked to a unique serial number, which can be encoded in a data matrix 129, for example. The data matrix 129 may be received to each surface 125, 125'125" as a label, for example. The data matrix 129 can include a code that is readable by each imaging device 106A-106C to look up the respective surface reflectance measurement R1, which is used as a normalization factor in the intensity calibration, in recording the golden device settings as well as in reproducing the setting in a target device (e.g., a second imaging device that is a substantial clone of the first imaging device 101). Therefore, the calibration method 600 becomes mostly independent of the calibration tool 124 used during each step of the method.

To record each individual intensity of the calibration tool 124, the front illumination can be turned on separately and jointly, extracting the intensity values from at least one region of interest in each viewpoint 1-3, separately and jointly. For example, in FIG. 4B, the frontal illumination for imaging device 106A is coming from light source 104B and 104C (e.g., light panels). The method 600 records the target intensity $I_{T1}$ at imaging device 106A that is reflected from the calibration tool 124 when only light source 104B is turned on, and the target intensity $I_{T2}$ at imaging device 106A when only light source 104C is turned on. They can then be turned on jointly and intensity values recorded.

Figure 5A:
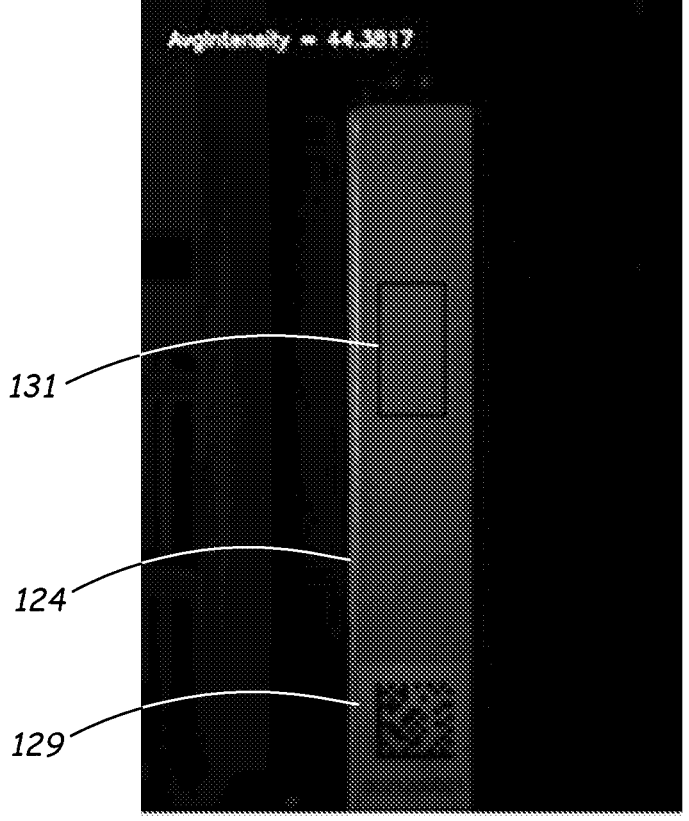
FIG. 5A illustrates a front view of a calibration tool including a region of interest (ROI) being illuminated at a target intensity and as observed by an imaging device with a first light source turned on according to one or more embodiments.
Figure 5B:
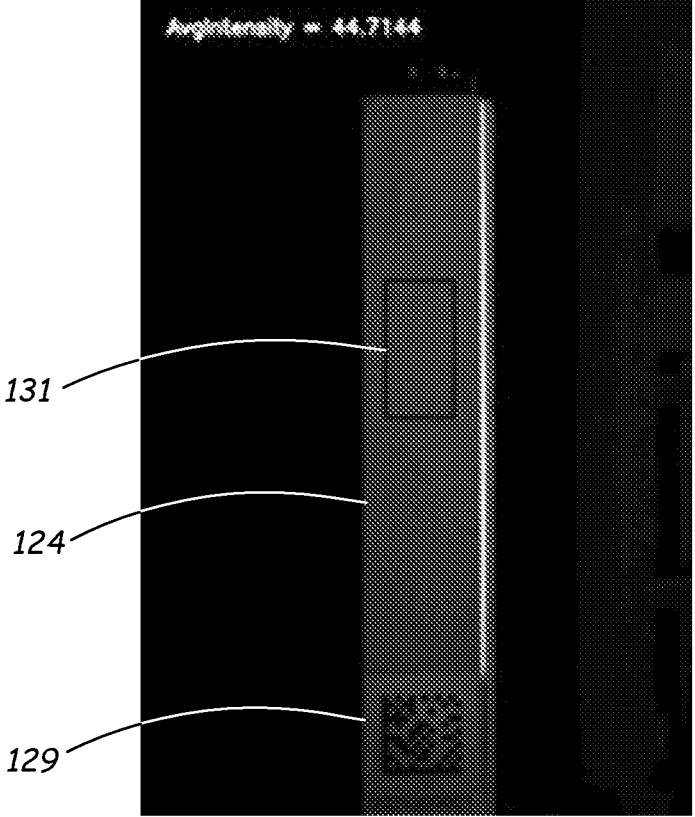
FIG. 5B illustrates a front view of a calibration tool including a region of interest (ROI) being illuminated at a target intensity as observed by an imaging device with another side light source turned on and the first light source turned off according to one or more embodiments.

FIGS. 5A and 5B show the average intensity a region of interest (ROI) 131 on the calibration tool 124 observed by imaging device 106A. The black rectangle on each image indicates the center region of the calibration tool 124 serving as the ROI 131. As stated above, recorded is an intensity value $I_{T12}$ at imaging device 106A when both light source 104B and 104C are turned on. Ideally, the value should be equal to the sum of target intensity $I_{T1}$ and target intensity $I_{T2}$ at imaging device 106A. The method can repeat the same recording of target intensities for each other imaging device 106B, 106C with respect to the corresponding frontal illumination for each illumination wavelength of light (e.g., R, G, and B). With this, the method has completed the golden device setting first stage with the target intensity values on the calibration tool 124 under the ideal light panel current settings $C_1$, $C_2$ at the first imaging device 101 (the "golden device").

Thus, according to the method 600, in block 612, at the respective recorded drive currents $C_1$, $C_2$, an intensity value is measured for each of the multiple front light sources 104B, 104C as a target intensity value $I_{T1}$, $I_{T2}$. For example, the target intensity value $I_{T1}$ is measured of the calibration surface 125 with light source 104B turned on and driven at drive current $C_1$, and with light source 104C turned off. Likewise, target intensity value $I_{T2}$ is measured of the calibration surface 125 with light source 104C turned on and driven at drive current $C_2$, and with light source 104B turned off. A joint target intensity $I_{T12}$ may also be measured with both light sources 104B, 104C turned on.

In the embodiment shown in FIG. 6, the same procedure of blocks 602-612 can be followed, in block 614, for each of the other wavelengths of the light sources 104B, 104C that will be used in characterizing the sample tube 102 and cap 214 during characterization. For example, each of the illuminations in 604 may be for a different wavelength of light, such as, for example, R, G, B, W, IR, and/or NIR. And each of the target intensity values $I_{T1}$, $I_{T2}$ in block 602 may be measured and recorded by imaging device 106A at each wavelength of illumination R, G, B, W, IR, and/or NIR. Joint target intensity value $I_{T12}$ may also be recorded. The target intensity values $I_{T1}$, $I_{T2}$, $I_{T12}$ as described herein may be obtained as an average of multiple measurements taken on the calibration surface 125, such as within the region of interest 131, or an average of all the pixels or patches (collection of pixels) in the region of interest 131.

Likewise, given there are a plurality of imaging devices 106A-106C and light sources 104A-104C arranged around the imaging location 109 and configured to capture lateral images of sample tubes 102 from the multiple viewpoints 1, 2, and 3, the other light sources 104B-104C may also be foreground illumination calibrated using the method 600, i.e., the method 600 may be repeated in block 616 for other viewpoints 2, 3, for example. Thus, light sources 104A and 104B may each be also calibrated for viewpoint 2 and intensities $I_{T1}$, $I_{T2}$, and $I_{T12}$ recorded with imaging device 106C. Likewise, light sources 104A and 104C may each be also calibrated for viewpoint 3 and intensities $I_{T1}$, $I_{T2}$, and $I_{T12}$ recorded with imaging device 106B. This may be accomplished for all the light sources used (R, G, B, W, IR, and/or NIR, for example) as well.

The imaging devices 106A-106C may be provided in close proximity to and trained or focused to capture an image window, i.e., an imaging location 109 including an expected location of the surface of the sample tube 102. During calibration, each image may be triggered and captured responsive to a triggering signal sent by computer 143. Each of the captured images may be processed according to one or more embodiments of the method 600 to provide the target intensity values $I_{T1}$, $I_{T2}$, and $I_{T12}$, which may be recorded as a representative value thereof for each image (e.g., an average, median, or mode value) for all the pixels representative of the calibration surface 125 at the ROI 131 thereof.

For each of the above setups, all of these multiple images taken at multiple respective spectra (e.g., R, G, B, W, NIR, and/or IR) may be obtained in rapid succession, such that the entire collection of images from the multiple viewpoints 1, 2, and 3 may be obtained in less than a few seconds, for example. Other lengths of time may be used.

The calibration method 600 comprises imaging that ideally takes place before pre-screening imaging measurements are actually taken by the imaging apparatus 101 of the quality check module 100. Thus, the calibration can be used for more than one pre-screening operation (e.g., pre-screening of multiple sample tubes 102) before a re-calibration is again performed. In some embodiments, a single calibration method 600 may be undertaken for a specific rack of sample tubes 102, for a lot of sample tubes 102, for a period of a day, a week, or a month, or other time period, after a certain number of sample tubes 102 are pre-screened, or any other suitable calibration period or interval.

Once the target intensity values on the calibration tool 124 are recorded, the method is ready to use these values and the tool 124 (or a like calibration tool) to calibrate one or more additional imaging apparatus 101 (e.g., multiple machines). First, the calibration tool 124 (or a like calibration tool) is moved to the center point (imaging location) of the new imaging apparatus (machine). Then the drive current $C_1$, $C_2$ of the light sources (e.g., panels) are adjusted until we reach the target intensity $I_{T1}$, $I_{T2}$ and/or possibly $I_{T12}$. Similar to the previous manner of recording, each light source (e.g., panel) can be adjusted separately and/or jointly for each viewpoint and wavelength of light.

For example, to calibrate the frontal illumination of clone imaging device 106A, we can calibrate the current $C_1$ of clone of light source 104B first until the average intensity of ROI 131 on the calibration tool 124 reaches the recorded value $I_{T1}$. Then the method 700 calibrates the drive current $C_2$ of light source 104C to reach the target intensity $I_{T2}$ while turning off light source 104B. Optionally, the joint target intensity $I_{T12}$ can be sought via adjustment of the current $C_2$ of the light source 104C while keeping the current of the light source 102B on at the calibrated current $C_1$. To speed up the method 700, two or more preset drive current settings (e.g., $C_1$, $C_2$) can be used to measure the corresponding intensities. With these drive current values, the current-intensity curve can be approximated with either a first-order or a second-order equation for predicting the drive current that will generate the target intensity (e.g., $I_{T1}$, $I_{T2}$). With this estimation, the target intensity may be reached with about 4 iterations. Employing such curve fitting can be used to speed up the calibration method.

Thus, according to the method 700, the calibration on the first imaging device 101 (golden device) can be used to calibrate other like (cloned) imaging devices that may be provided in other quality check modules that are identical or substantially identical to quality check module 100 that carried out the first calibration method 600. Such additional imaging devices may be calibrated using a calibration method 700, as is shown in FIG. 7.

Figure 7:
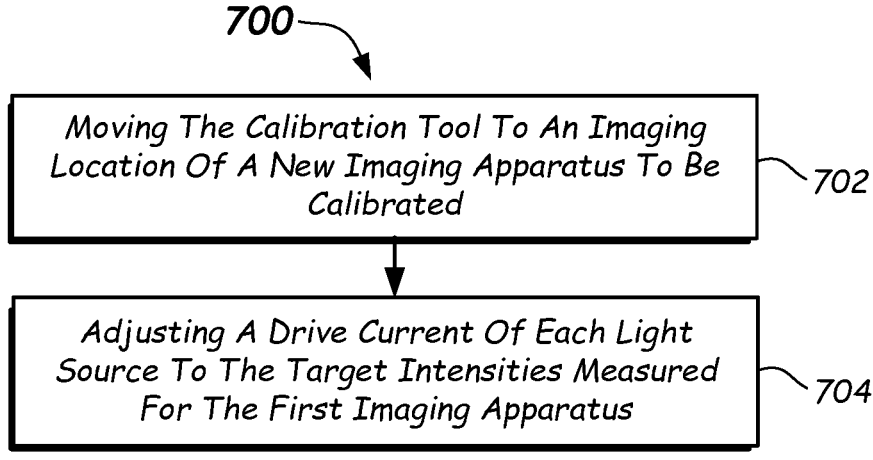
FIG. 7 illustrates flowchart of a calibration method adapted to calibrate a new imaging apparatus based on target intensities obtained from a first imaging apparatus according to one or more embodiments.
Figure 8:
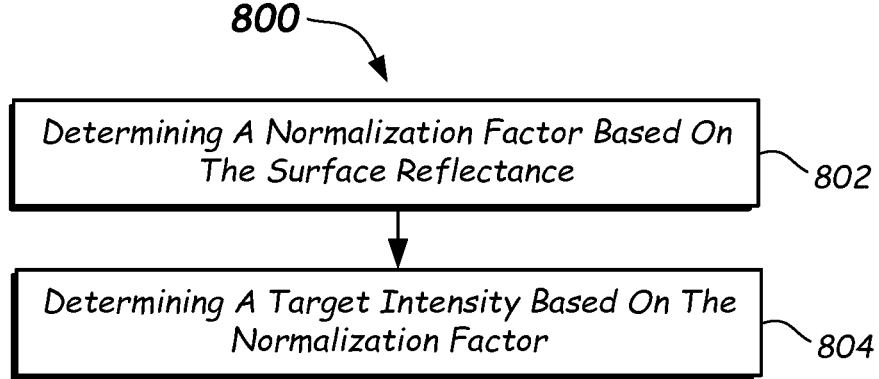
FIG. 8 illustrates flowchart of a portion of a calibration method wherein the new calibration tool is different that the calibration tool used to calibrate the first imaging apparatus according to one or more embodiments.

FIG. 7 illustrates a flowchart of a calibration method 700 operable with any clone of the first imaging apparatus 101 (the golden device). According to one or more embodiments, the calibration method 700, in 702, comprises moving the calibration tool 124 to an imaging location (imaging location 109) of a new imaging apparatus (clone of first imaging apparatus 101) to be calibrated. In block 704, the drive current $C_1$, $C_2$ of each light source (light sources 104A, 104B) are adjusted so as to reach the target intensities measured for the first imaging device, such as two or more of the target intensities $I_{T1}$, $I_{T2}$, $I_{T12}$.

According to one or more embodiments, the calibration of the second imaging apparatus that is a clone of imaging apparatus 101 and possibly subsequent imaging apparatus using method 700 and by using target intensities $I_{T1}$, $I_{T2}$, and/or $I_{T12}$ from the first imaging apparatus 101 can utilize a different calibration tool than calibration tool 124. One advantage of the method 700 is that the foreground illumination calibration can be automated to ensure consistent lighting across multiple machines (clones of imaging apparatus 101).

Thus, one embodiment of the calibration method involves installing a calibration tool 124 at an imaging location of a second imaging device (e.g., a clone of the first imaging device 101) and then calibrating a first drive current $C_1$ of a first light source (clone of first light source 104B) of the second imaging device until an average intensity of a ROI on the calibration tool 124 reaches a measured target intensity value of a first light source 104B of the first imaging device 101. The method further includes calibrating a second drive current $C_2$ of a second light source (e.g., clone of second light source 104C) of the second imaging device until an average intensity of the ROI on the calibration tool 124 reaches a measured target intensity value of a second light source 104C of the first imaging device 101 while turning off the first light source.

The calibration method can include recording a first target intensity value $I_{T1}$ for the first light source 104B of the multiple front light sources of the first imaging device 101, and recording a joint target intensity $I_{T12}$ for the multiple front light sources (light source 104B and Light source 104C illuminated together), that can be used to calibrate such second imaging devices.

Another embodiment of the calibration method can involve installing a calibration tool 124 at an imaging location 109 of a second imaging device (e.g., a clone of the first imaging device 101), and then calibrating a first drive current $C_1$ of a first light source (e.g., clone of light source 104B) of the second imaging device until an average intensity of a ROI on the calibration tool 124 reaches the first target intensity value $I_{T1}$ of the first light source (e.g., first light source 104B) of the first imaging device 101. The method further includes calibrating a second drive current $C_2$ of a second light source (e.g., clone of light source 104C) of the second imaging device until an average intensity of the ROI on the calibration tool 124 reaches a joint target intensity $I_{T12}$ for the multiple front light sources while leaving on the first light source of the second imaging device.

In these instances the new calibration tool may have a different surface reflectance value than the calibration tool 124. In such instances, the method 800 shown in FIG. 8 may use normalization factor $N_f$. In block 802, the normalization factor is determined based on the surface reflectance value $R_{s1}$ of the calibration tool 124 used to carry out the calibration of the first imaging apparatus 101 (golden device) and the reflectance value $R_{snew}$ of the new calibration tool used to calibrate the other imaging apparatus (clone of first imaging apparatus 101). The normalization factor $N_f$ is expressed as:

$$N_f = R_{snew}/R_{s1}$$

The target intensities used for calibrating the new imaging apparatus (clone of first imaging apparatus 101) are determined in 804, and expressed as:

$$I_{T1new} = I_{T1}N_f$$

$$I_{T2new} = I_{T2}N_f$$

These new target intensity values $I_{T1new}$ and $I_{T2new}$ can be used with the new calibration tool installed in the new imaging apparatus at the imaging location 109 thereof to calibrate the new imaging device by adjusting the drive currents for each of the respective cloned front light source for the particular viewpoint 1-3 and wavelength. For example, clones of light sources 104B, 104C for viewpoint 1, clones of light sources 104A, 104B for viewpoint 2, and clones of light sources 104A, 104C for viewpoint 3. Clone as used herein refers to the imaging components that would affect the images that are being cloned (functional copies) of those of the first imaging device 101, such as light sources 104A-104C, imaging devices 106A-106C, housing and the like. Some changes can be made to the components of the second imaging device provided they do not affect the optical properties thereof.

Using the methods described herein, consistent lighting across multiple imaging devices of machines can be provided. This allows sample tube type characterization of features based on cap color and appearance, for example, which is useful for tube sorting purposes, or even identification of improper sample tube usage for an ordered test.

Device Dependent Setting without a Calibration Tool

Once we've the calibrated drive currents for a specific imaging apparatus 101 (machine), the foreground illumination can be re-calibrated without using the calibration tool 124. This is useful when the light sources (e.g., light panels) gradually get degraded or replaced, while the whole setup in terms of geometry placement of the imaging devices 106A-106C and light sources 104A-104C remains the same. Based on the previous calibration method 600 with the calibration tool 124, the target intensity can be directly measured on the light sources 104A-104C (e.g., light panels) instead of using the calibration tool 124.

For example, to calibrate light source 104B as a front light source for imaging device 106A and light source 104C as a front light source for imaging device 106A when there is no calibration tool 124, the intensity value of light source 104B as observed by imaging device 106B is recorded and the intensity value of light source 104C as observed by imaging device 106C is recorded when they are turned on separately at their respective calibrated drive currents $C_1$, $C_2$.

Figure 9A:
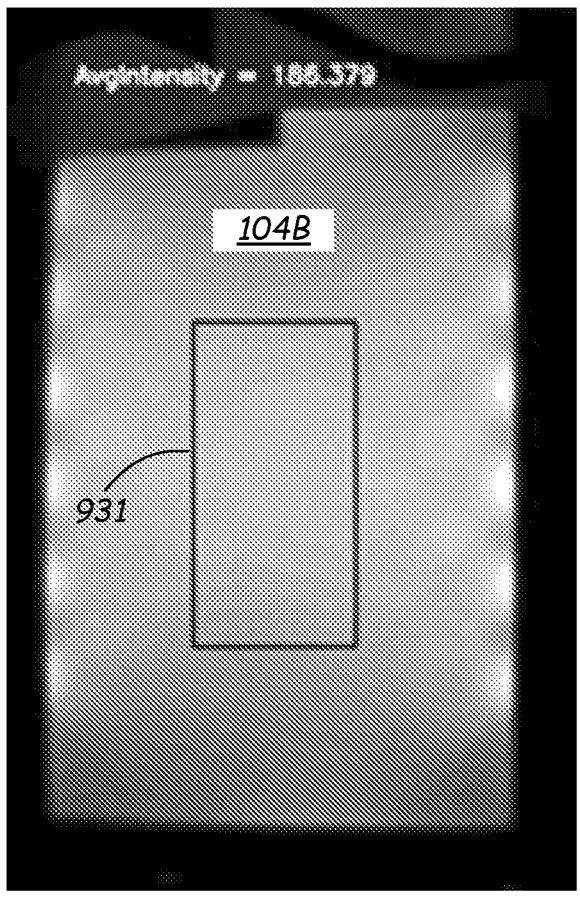
FIG. 9A illustrates a photograph of the illumination intensity of a light source (light panel 104B) as captured by imaging device 106B according to one or more embodiments.
Figure 9B:
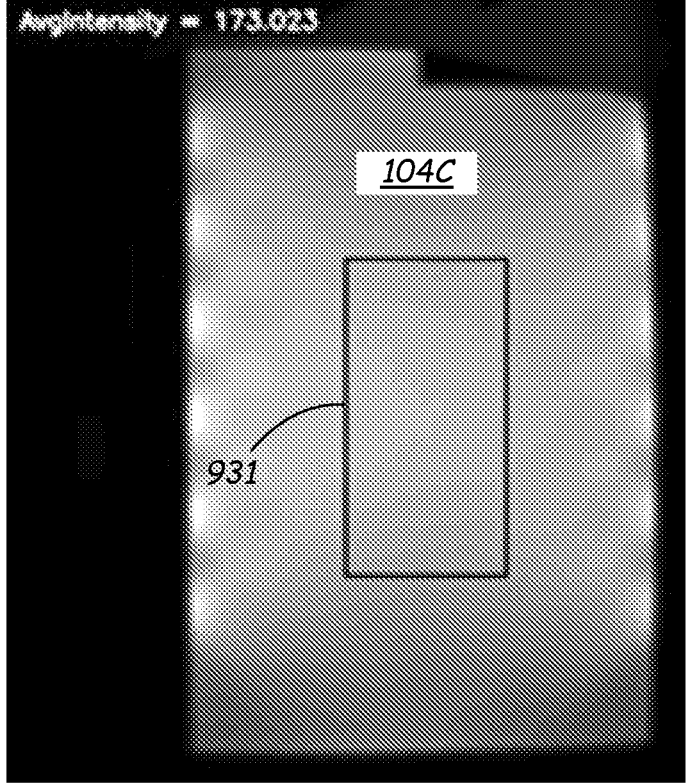
FIG. 9B illustrates a photograph of the illumination intensity of a light source (light source 104C) as captured by imaging device 106C according to one or more embodiments.

Sample images of the light source 104B observed by imaging device 106B (FIG. 9A) and light source 104C observed by imaging device 106C are shown in FIG. 9B. These are sample images for re-calibration without a calibration tool 124. The frontal illumination of imaging device 106A from light source 104B and light source 104C are directly calibrated when (a) the light source 104B is observed by imaging device 106B, and (b) the light source 104C is observed by imaging device 106C. The black rectangle on each image indicates the center region of the panel serving as the region of interest (ROI) 931.

Thus, the calibration method can further comprise, without the calibration tool 124 at the imaging location 109, measuring a first intensity value $I_1$ at the region of interest 931 of a first front light source (e.g., light source 104B) of multiple front light sources with a first imaging device (e.g., imaging device 106B) directly facing the first front light source (e.g., light source 104B), and measuring a second intensity value I$_2$ at a region of interest 931 of a second front light source (e.g., light source 104C) of the multiple front light sources with a second imaging device (e.g., imaging device 106C) directly facing the second front light source (e.g., light source 104C). The first intensity value I$_1$ and the second intensity value I$_2$ can then be used to re-calibrate the front lighting first imaging apparatus 101. The recalibration can take place from time to time at any suitable interval as front illumination quality check.

Note that as the calibration tool 124 has a relatively lower reflectance value than the light sources (panels), the direct light observed from the imaging device without the calibration tool 124 will easily saturate the intensity. Therefore, it may be desirable, for example, to lower the exposure time of the respective light source while keeping its drive current the same as C$_1$, C$_2$, and then use the imaging device 106B, 106C directly facing the respective light source 104B, 104C to record its intensity at the ROI 931 of the respective light source 104B, 104C. With these tool-independent target intensity settings, we can then calibrate the foreground illumination individually by using the image of the respective imaging devices 106B, 106C directly. We can also employ similar curve-fitting approach as discussed above to speed up the method. According to this re-calibration method, less than 5% of a current difference can result when attempting to recover the drive current without using the calibration tool 124.

The no-tool approach allows health checks to be run without requiring the operator/system to manually load any special tools, wherein such heath checks can be accomplished automatically. This automated approach allows health checks to be run on a regular or other incremental basis, ensuring the quality/performance that is needed in a medical testing device, such as a quality check apparatus.

In accordance with another embodiment, a calibration method is provided that can perform a health check of a previously-calibrated imaging apparatus. In particular, the calibration method 1000 is shown and described with reference to FIG. 10. The calibration method 1000 comprises, in block 1002, providing a previously-calibrated imaging apparatus (e.g., imaging apparatus 100) that has been previously calibrated according to an initial calibration method (e.g., calibration method 600 or other suitable calibration method). The calibration method 1000 further comprises, in block 1004, placing a calibration tool 1124 having a calibration surface 1125 of a known reflectance R1 at an imaging location 109 of the previously-calibrated imaging apparatus 100. The calibration tool 1124 can be of any type of tool having a calibration surface 1125 of a known reflectance R1 for each viewpoint, such as the cylindrical calibration tool 1124 shown in FIGS. 11A and 11B. The calibration tool 1124 has a calibration surface 1125 of a known reflectance R1 value. In this embodiment, the calibration surface 1125 can extend 360 degrees around the circumference of the calibration tool 1124 and can be applied as a label or as a painted surface. Thus, the calibration surface can be viewable from multiple viewpoints, such as viewpoints 1, 2, and 3. The calibration tool 1124 can have a certified reflectance surface to facilitate the calibration method. Thus, the calibration surface 1125 of known reflectance R1 may be provided for each of viewpoints 1, 2 and 3, respectively. The calibration tool 1124 can further include a holding portion 1127, which may be in the shape of a bottom of a sample tube 102, so that the calibration tool 1124 can be received in carrier 122 (see FIG. 4A) in an upright orientation at the imaging location 109 of the previously-calibrated imaging apparatus 100.

The calibration method 1000 further comprises, in block 1006, illuminating the calibration surface 1125 with light emitted from one or more front light sources that were previously calibrated according to the initial calibration method. The one or more light sources for front lighting may comprise light sources 104B, 104C for viewpoint 1, for example. Likewise, the one or more light sources for front lighting of viewpoint 2 can be light sources 104A and 104B. Similarly, the one or more light sources for front lighting of viewpoint 3 can be light sources 104A and 104C.

The calibration method 1000 further comprises, in block 1008, measuring intensity values at a region of interest 1131 of the calibration surface 1125. This can be done for each viewpoint 1, 2, and 3. In this embodiment, the region of interest (ROI) 1131 is an area that is nearly as wide as the calibration tool 1124 and tall enough to cover the region where the serum or plasma portion 212SP is likely to be located during imaging in use. Moreover, the region of interest 1131 should be of the approximate same size as the region of interest (ROI) that was used for the initial calibration. Finally, the method 110 comprises, in block 1110, verifying that the previously-calibrated imaging apparatus 100 is still performing within specifications based upon measured intensity values of the region of interest (ROI) 1131.

Figures 11A, 11B, 11C:
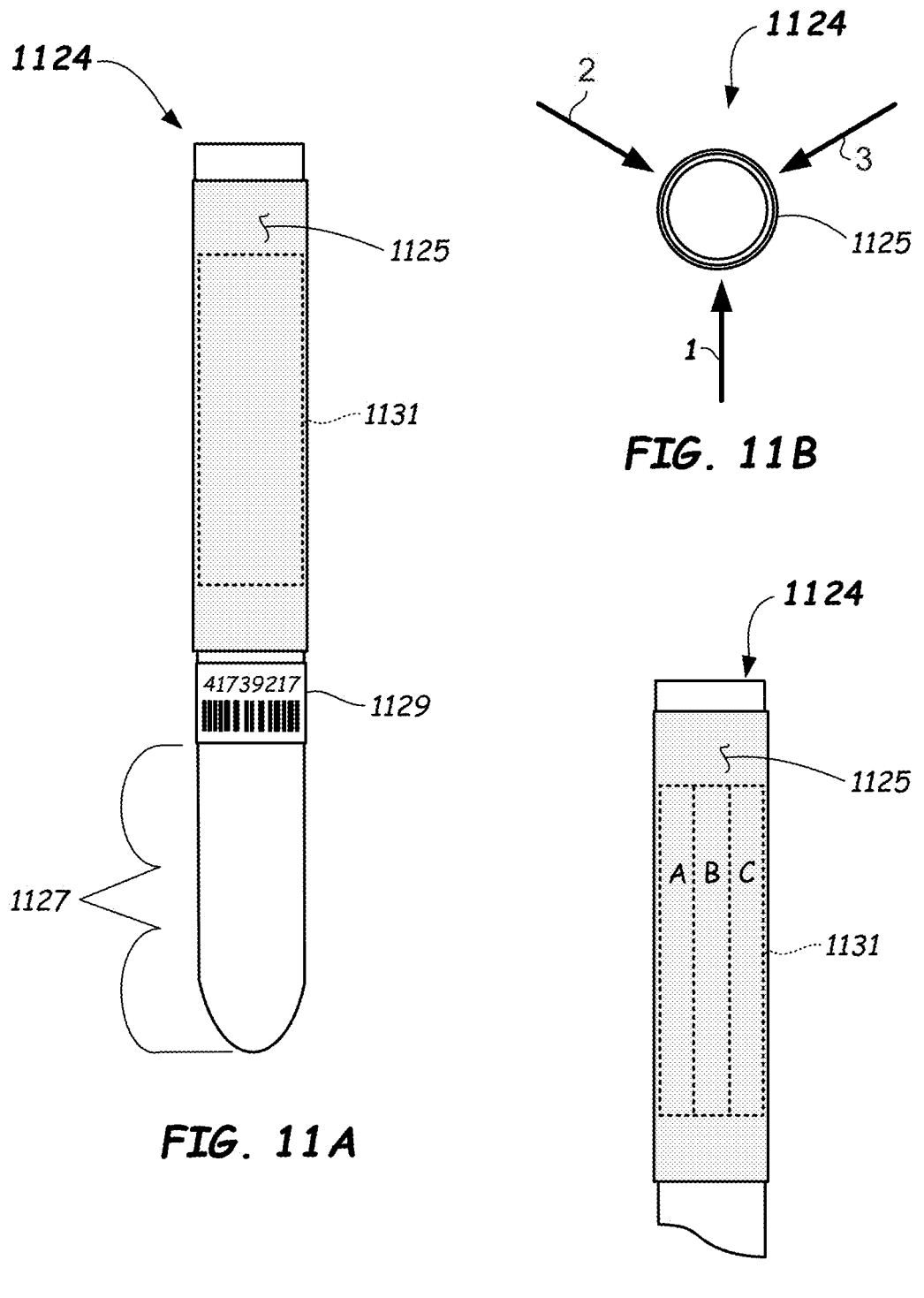
FIGS. 11A and 11B illustrate side and top views, respectively, of a calibration tool enabling a health check of a previously-calibrated imaging apparatus according to one or more embodiments.
FIG. 11C illustrates a partial side view of a calibration tool enabling a health check of a previously-calibrated imaging apparatus wherein the region of interest has been split into multiple regions according to one or more embodiments.

As shown in FIG. 11A, the calibration tool 1124 can include a data matrix 1129 that is readable from at least one viewpoint (viewpoint 1 as shown). The data matrix can be a unique serial number, which can be encoded in a data matrix 1129, for example. The data matrix 1129 is readable by the imaging device 106A as shown to look up the respective surface reflectance measurement R in a database. Optionally, the surface reflectance value itself may be coded in the data matrix 1129. If the same calibration tool 1124 was used for the initial calibration then the reflectance value R1 can be used. However, if a different calibration tool was used for the initial calibration then the reflectance value R1 should be normalized by a normalization factor N$_f$ as described below. The normalization factor N$_f$ is expressed as:

$$N_f = R_1/R_{old}$$

wherein R$_{old}$ is the reflectance of the initial calibration surface used.

According to another aspect of the calibration method 1000, if upon attempting to verify that the previously-calibrated imaging apparatus is within specifications in block 1010, the previously-calibrated imaging apparatus 100 is found to be outside of the allowable specification, then the respective intensity values of the region of interest 1131 can be adjusted in block 1012. The desired intensity at the region of interest 1131 is the calibrated intensity value of the region of interest that has been previously calibrated according to the initial calibration method. The adjustments can be up or down depending on which way the intensity is out of the specification. The specification can be a band of preset intensities, for example, such as +/−5% from a target nominal intensity value. In particular, the adjusting in block 1012 can comprise adjusting a drive current to the one or more front light sources to establish a desired intensity at the region of interest 1131.

It should be recognized that the initial calibration can be accomplished by any method wherein a measurement of intensity of a region of interest (ROI) is obtained. In some embodiments, the previously-calibrated imaging apparatus 100 can be initially calibrated according to the method described with reference to FIG. 6. The calibration tool 1124 having the calibration surface 1125 of the known reflectance R1 can, in some embodiments, comprise a grey surface. The gray surface can substantially surround a circumference of the calibration tool 1124 and can extend vertically such that the grey surface is at least as large as the region of interest 1131. As shown, the calibration tool 1124 comprises a cylindrical outer surface. However, the calibration tool may have other configurations, such as having a planar surface for each respective viewpoint 1, 2, and 3.

A further heath check can be conducted using the calibration tool 1124 to verify other aspects of the health of a previously-calibrated imaging apparatus 100. In particular, a white balance heath check and/or an ambient light health check can be conducted. The ambient light health check helps to ensure that there is no excessive light (in any color channel). The white balance health check can verify that all three imaging devices 106A, 106B, 106C are white balanced internally. The gray colored imaging surface 1125 of the calibration tool 1124 is used as a reference material, since the expectation is that all three color channels (RGB) would output similar values to the sensors of the imaging devices 106A, 106B, 106C (within tolerance).

In the case of the calibration tool 1124 having a cylindrical outer surface, the image of the region of interest 1131 for each viewpoint 1, 2, and 3 may be split vertically into multiple sub-regions such as the three equal-sized sub-regions A, B, and C shown in FIG. 11C. In particular, the region of interest (ROI) 1131 is extracted for each viewpoint 1, 2, and 3 by each respective imaging device 106A, 106B, 106C, and each image is processed by being vertically split into three sub-regions (equal sub-regions A, B, C). For each sub-region A, B, and C, the R/G/B values received by the sensors of the respective imaging devices 106A, 106B, and 106C would ideally be within a pre-designed tolerance. Color values outside of the tolerance would be indicative of improper white balance for a sub-region, which then may be adjusted. Incorrect white balancing might lead to the wrong cap color being detected, for example. Furthermore, sub-regions A and C and region B can have a maximum intensity tolerance check performed (for all color channels) to make sure that there isn't too much ambient light present for any channel. Excessive external/ambient light present could potentially lead to washed out barcodes.

While the disclosure is susceptible to various modifications and alternative forms, specific system, apparatus and method embodiments thereof have been shown by way of example in the drawings and are described in detail herein. It should be understood, however, that it is not intended to limit the disclosure to the particular system, apparatus or methods disclosed but, to the contrary, the intention is to cover all modifications, equivalents, and alternatives falling within the scope of the claims.

What is claimed is:

1. A calibration method, comprising:

providing a calibration tube including an imaging surface at an imaging location of an imaging apparatus;

illuminating the imaging surface with light emitted from multiple front light sources;

adjusting non-zero current values of a drive current to each of the multiple front light sources to establish a substantially uniform intensity of the imaging surface;

recording drive current values for the multiple front light sources that established the substantially uniform intensity of the imaging surface;

replacing the calibration tube with a calibration tool having a calibration surface of a known reflectance; and measuring target intensity values of the calibration tool at the respective drive current values.

2. The calibration method of claim 1, wherein the measuring of the target intensity values of the calibration tool at the drive current values is performed by an imaging device.

3. The calibration method of claim 1, wherein the adjusting the non-zero current values of the drive current to each of the multiple front light sources occurs sequentially.

4. The calibration method of claim 1, wherein the target intensity values comprise average intensity of a region of interest on the calibration tool.

5. The calibration method of claim 1, further comprising:

installing the calibration tool at an imaging location of a separate imaging apparatus; and adjusting a drive current to a current value for each of the front light sources of the separate imaging apparatus to achieve the same target intensity values measured for the imaging apparatus.

6. The calibration method of claim 5, further comprising:

adjusting a drive current to a current value for each of the front light sources so that an intensity value for each of the front light sources of the separate imaging apparatus is the same as the target intensity value of each of the front light sources of the imaging apparatus.

7. The calibration method of claim 1, further comprising:

installing a calibration tool at an imaging location of a separate imaging apparatus;

calibrating a first drive current of a first light source of the separate imaging apparatus until an average intensity of a region of interest on the calibration tool reaches a measured target intensity value of a first light source of the imaging apparatus; and calibrating a second drive current of a second light source of the separate imaging apparatus until an average intensity of the region of interest on the calibration tool reaches a measured target intensity value of a second light source of the imaging apparatus while turning off the first light source.

8. The calibration method of claim 1, further comprising:

recording a first target intensity value for a first light source of the multiple front light sources, and recording a joint target intensity value for the multiple front light sources.

9. The calibration method of claim 8, further comprising:

installing a calibration tool at an imaging location of a separate imaging apparatus;

calibrating a first drive current of a first light source of the separate imaging apparatus until an average intensity of a region of interest on the calibration tool reaches the first target intensity value of the first light source of the imaging apparatus; and calibrating a second drive current of a second light source of the separate imaging apparatus until an average intensity of the region of interest on the calibration tool reaches the joint target intensity for the multiple front light sources, while leaving on the first light source of the separate imaging apparatus.

10. The calibration method of claim 1, further comprising:

without the calibration tool at the imaging location, measuring a first intensity value at a region of interest of a first front light source of the multiple front light sources with a first imaging device directly facing the first front light source, and measuring a second intensity value at a region of interest of a second front light source of the multiple front light sources with a second imaging device directly facing the second front light source.

11. The calibration method of claim 10, further comprising:

at a later time, re-calibrating the imaging apparatus using the first intensity value and the second intensity value.

12. The calibration method of claim 1, wherein the illuminating the imaging surface with light emitted from the multiple front light sources is conducted for each spectrum of light used for the illumination.

13. The calibration method of claim 1, wherein the multiple front light sources comprise spectrally-switchable lighting sources that are spectrally-switchable between at least two light spectra.

14. The calibration method of claim 1, wherein the imaging location is located within an imaging chamber formed by a collection of walls of a housing of the imaging apparatus.

15. The calibration method of claim 1, wherein the calibration tube is located at the imaging location and is resident on a carrier.

16. The calibration method of claim 1, wherein the substantially uniform intensity of the imaging surface is measured by an imaging device and is uniform within +/−20% of an average intensity within a region of interest when measured on a pixel by pixel basis.

17. The calibration method of claim 1, wherein replacing the calibration tube with a calibration tool having a calibration surface of the known reflectance comprises replacing with a calibration tool of a prism shape wherein each planar side is facing an imaging device.

18. The calibration method of claim 17, wherein each of the sides of the calibration tool corresponding to each viewpoint of each imaging device has a certified reflectance surface of a known reflectance value.

19. The calibration method of claim 1, further comprising:

providing a previously-calibrated imaging apparatus that has been previously calibrated according to the calibration method of claim 1;

placing a calibration tool having a calibration surface of a known reflectance at an imaging location of the previously-calibrated imaging apparatus;

illuminating the calibration surface with light emitted from one or more front light sources previously calibrated;

measuring intensity values at a region of interest of the calibration surface; and verifying that the previously-calibrated imaging apparatus is still performing within specifications based upon measured intensity values of the region of interest.

* * * * *